US009585040B2

(12) United States Patent
Nogami et al.

(10) Patent No.: US 9,585,040 B2
(45) Date of Patent: Feb. 28, 2017

(54) TERMINAL, BASE STATION, COMMUNICATION SYSTEM, AND COMMUNICATION METHOD

(71) Applicants: Toshizo Nogami, Osaka (JP);
Kazuyuki Shimezawa, Osaka (JP);
Kimihiko Imamura, Osaka (JP);
Daiichiro Nakashima, Osaka (JP)

(72) Inventors: Toshizo Nogami, Osaka (JP);
Kazuyuki Shimezawa, Osaka (JP);
Kimihiko Imamura, Osaka (JP);
Daiichiro Nakashima, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 9 days.

(21) Appl. No.: 14/356,424

(22) PCT Filed: Nov. 2, 2012

(86) PCT No.: PCT/JP2012/078415
§ 371 (c)(1),
(2) Date: May 6, 2014

(87) PCT Pub. No.: WO2013/069549
PCT Pub. Date: May 16, 2013

(65) Prior Publication Data
US 2014/0301234 A1    Oct. 9, 2014

(30) Foreign Application Priority Data

Nov. 7, 2011 (JP) ................................ 2011-242965

(51) Int. Cl.
*H04L 12/26* (2006.01)
*H04W 24/08* (2009.01)
(Continued)

(52) U.S. Cl.
CPC ........... *H04W 24/08* (2013.01); *H04L 5/0053* (2013.01); *H04L 1/1812* (2013.01); *H04L 5/001* (2013.01); *H04L 5/0048* (2013.01)

(58) Field of Classification Search
USPC ......... 370/241–252, 312–329; 455/418–452;
709/201–219
See application file for complete search history.

(56) References Cited

U.S. PATENT DOCUMENTS 8,520,620 B2 * 8/2013 Ji ........................... H04J 11/005
370/328
8,520,621 B2 * 8/2013 Tee ......................... H04L 5/001
370/329
(Continued)

FOREIGN PATENT DOCUMENTS

JP      2011-223127 A      11/2011
WO      2011/137383 A1     11/2011
WO      2012/109542 A1     8/2012

OTHER PUBLICATIONS

Official Communication issued in International Patent Application No. PCT/JP2012/078415, mailed on Jan. 29, 2013.
(Continued)

*Primary Examiner* — Man Phan
(74) *Attorney, Agent, or Firm* — Keating & Bennett, LLP

(57) ABSTRACT

A terminal that communicates with a base station monitors a physical downlink control channel that is arranged in a physical downlink control channel region and that specifies transmission of broadcast information, obtains higher layer control information that specifies monitoring in an extended physical downlink control channel region, which is different from the physical downlink control channel region, and, in a case where the higher layer control information has been obtained, monitors an extended physical downlink control channel that is arranged in the extended physical downlink
(Continued)

control channel region and that specifies the transmission of the broadcast information instead of the physical downlink control channel arranged in the physical downlink control channel region.

4 Claims, 19 Drawing Sheets

(51) Int. Cl.
*H04L 5/00* (2006.01)
*H04L 1/18* (2006.01)

(56) References Cited

U.S. PATENT DOCUMENTS

| | | | |
|---|---|---|---|
| 8,537,862 B2* | 9/2013 | Blankenship | H04L 5/0053 370/252 |
| 8,804,586 B2* | 8/2014 | Fong | H04L 5/0053 370/311 |
| 8,811,207 B2* | 8/2014 | Iraji | H04W 72/042 370/252 |
| 9,143,207 B2* | 9/2015 | Kim | H04B 7/024 |
| 2011/0075624 A1* | 3/2011 | Papasakellariou | H04L 5/0053 370/329 |
| 2011/0170496 A1 | 7/2011 | Fong et al. | |
| 2011/0269442 A1* | 11/2011 | Han | H04W 72/082 455/418 |
| 2012/0106465 A1* | 5/2012 | Haghighat | H04W 72/1289 370/329 |
| 2013/0003604 A1* | 1/2013 | Blankenship | H04L 5/0053 370/255 |
| 2013/0051269 A1 | 2/2013 | Suzuki et al. | |

OTHER PUBLICATIONS

3GPP TS 36.211 V10.2.0, "3rd Generation Partnership Project; Technical Specification Group Radio Access Network; Evolved Universal Terrestrial Radio Access (E-UTRA); Physical Channels and Modulation (Release 10)", Jun. 2011, pp. 22-24.

3GPP TS 36.213 V10.2.0, "3rd Generation Partnership Project; Technical Specification Group Radio Access Network; Evolved Universal Terrestrial Radio Access (E-UTRA); Physical layer procedures (Release 10)", Jun. 2011, p. 95.

Sharp, 3GPP TSG RAN WG1 Meeting #67, R1-113827, "Common search space design for ePDCCH", San Francisco, USA, Nov. 14-18, 2011, pp. 1-3.

LG Electronics, "Consideration on Common Search Space Configuration for rel-11 UEs", 3GPP TSG RAN WG1, Meeting #66b, R1-113196, Oct. 10-14, 2011, 5 pages.

Ericsson et al., "On Enhanced PDCCH Design", 3GPP TSG-RAN WG1, #66bis, R1-112928, Oct. 10-14, 2011, 4 pages.

* cited by examiner

PRIOR ART

TERMINAL, BASE STATION, COMMUNICATION SYSTEM, AND COMMUNICATION METHOD

TECHNICAL FIELD

The present invention relates to a terminal, a base station, a communication system, and a communication method.

BACKGROUND ART

In a radio communication system such as LTE (long term evolution) or LTE-A (LTE-advanced) developed by the 3GPP (Third Generation Partnership Project) or wireless LAN or WiMAX (worldwide interoperability for microwave access) developed by the IEEE (Institute of Electrical and Electronics Engineers), a base station (a base station device, a downlink transmission device, an uplink reception device, or an eNodeB) and a terminal (a terminal device, a mobile station device, a downlink reception device, an uplink transmission device, or UE) each include a plurality of transmission and reception antennas, and realize high-speed data communication by spatially multiplexing data signals using a MIMO (multi-input multi-output) technology. In addition, especially in LTE and LTE-A, high spectral efficiency is realized by using an OFDM (orthogonal frequency-division multiplexing) scheme in a downlink while suppressing peak power using an SC-FDMA (single-carrier frequency-division multiple access) scheme in an uplink.

FIG. 21 is a diagram illustrating the configuration of a communication system in LTE. In FIG. 21, a base station 2101 transmits control information regarding downlink transmission data 2104 to a terminal 2102 through a physical downlink control channel (PDCCH) 2103. First, the terminal 2102 detects the control information, and when the control information has been detected, extracts the downlink transmission data 2104 using the detected control information. This downlink transmission data might be transmission data intended for the terminal 2102 or might be transmission data shared by a plurality of terminals, such as paging or system information (NPL 1 and NPL 2.)

CITATION LIST

Non Patent Literature

NPL 1: 3rd Generation Partnership Project; Technical Specification Group Radio Access Network; Evolved Universal Terrestrial Radio Access (E-UTRA); Physical Channels and Modulation (Release 10), June 2011, 3GPP TS 36.211 V10.2.0 (2011-06)

NPL 2: 3rd Generation Partnership Project; Technical Specification Group Radio Access Network; Evolved Universal Terrestrial Radio Access (E-UTRA); Physical layer procedures (Release 10), June 2011, 3GPP TS 36.213 V10.2.0 (2011-06)

SUMMARY OF INVENTION

Technical Problem

However, in order to increase the number of terminals that can be handled by one base station, not only the physical downlink control channel but also an extended physical downlink control channel can be used. Therefore, transmission data intended for each terminal cannot be efficiently mapped using an existing method. In particular, transmission data shared by a plurality of terminals, such as broadcast information, cannot be specified, which undesirably prevents improvement of transmission efficiency.

The present invention has been established in view of the above problem, and aims to provide a base station, a terminal, a communication system, and a communication method capable of efficiently specifying transmission data intended for each terminal or transmission data shared by a plurality of terminals in a radio communication system in which the base station and the terminal communicate with each other not only when the base station transmits control information intended for the terminal using a physical downlink control channel but also when the base station transmits the control information using an extended physical downlink control channel.

Solution to Problem (1) The present invention has been established in order to solve the above problem, and a terminal according to an aspect of the present invention is a terminal that communicates with a base station. The terminal includes a downlink control channel detection unit that monitors a physical downlink control channel arranged in a physical downlink control channel region and an extended physical downlink control channel arranged in an extended physical downlink control channel region, which is different from the physical downlink control channel region. Each of resource block pairs in the extended physical downlink control channel region is divided into a plurality of partial resource block pairs. The extended physical downlink control channel is configured by one or more logical resource elements. Each set of K logical resource elements is mapped in each set of K partial resource block pairs. Each of the partial resource block pairs in each set of the partial resource block pairs is divided into K components in time and frequency directions. Each of the logical resource elements in each set of the logical resource elements is divided into K components and each of the K components obtained as a result of the division is mapped in each of K components obtained by dividing each of the partial resource block pairs. The plurality of components, namely the K components, obtained by dividing each of the logical resource elements are mapped in components obtained by dividing at least two different partial resource block pairs.

(2) In addition, a terminal according to an aspect of the present invention is the above-described terminal. A $k_2$-th component ($k_2$ is one of values of 1, 2, ..., and K) of a $k_1$-th logical resource element ($k_1$ is one of values of 1, 2, ..., and K) in each set of the logical resource elements is mapped in a $k_2$-th component of a $(\mathrm{mod}(k_1+k_2-2, K)+1)$-th partial resource block pair in each set of the partial resource block pairs.

(3) In addition, a terminal according to an aspect of the present invention is a terminal that communicates with a base station. The terminal includes a downlink control channels detection unit that monitors a physical downlink control channel arranged in a physical downlink control channel region and a first extended physical downlink control channel arranged in an extended physical downlink control channel region, which is different from the physical downlink control channel region, and a higher layer control information obtaining unit that obtains higher layer control information that specifies monitoring of a second extended physical downlink control channel in the extended physical downlink control channel region. In a case where the higher layer control information obtaining unit has obtained the higher layer control information, the downlink control channel detection unit monitors the second extended physical downlink control channel arranged in the extended physical downlink control channel region instead of the physical downlink control channel arranged in the physical downlink control channel region.

(4) In addition, a terminal according to an aspect of the present invention is the above-described terminal. The physical downlink control channel and the second extended physical downlink control channel are provided with CRC bits scrambled by an identifier for broadcast information, and the first extended physical downlink control channel is provided with CRC bits scrambled by an identifier unique to the terminal.

(5) In addition, a terminal according to an aspect of the present invention is a terminal that communicates with a base station. The terminal includes a downlink control channel detection unit that monitors a physical downlink control channel that is arranged in a physical downlink control channel region and that specifies transmission of broadcast information, and a higher layer control information obtaining unit that obtains higher layer control information that specifies monitoring in an extended physical downlink control channel region, which is different from the physical downlink control channel region. In a case where the higher layer control information obtaining unit has obtained the higher layer control information, the downlink control channel detection unit monitors an extended physical downlink control channel that is arranged in the extended physical downlink control channel region and that specifies the transmission of the broadcast information instead of the physical downlink control channel arranged in the physical downlink control channel region.

(6) In addition, a terminal according to an aspect of the present invention is the above-described terminal. The broadcast information is paging information.

(7) In addition, a terminal according to an aspect of the present invention is the above-described terminal. The broadcast information is system information.

(8) In addition, a terminal according to an aspect of the present invention is the above-described terminal. The physical downlink control channel and the extended physical downlink control channel are provided with CRC bits scrambled by an identifier for the broadcast information.

(9) In addition, a terminal according to an aspect of the present invention is the above-described terminal. The extended physical downlink control channel region is configured in a physical downlink shared channel region.

(10) In addition, a terminal according to an aspect of the present invention is the above-described terminal. The extended physical downlink control channel is arranged in the extended physical downlink control channel region in a distributed manner.

(11) In addition, a terminal according to an aspect of the present invention is the above-described terminal. The higher layer control information indicates whether or not the extended physical downlink control channel is arranged in the extended physical downlink control channel region in a distributed manner.

(12) In addition, a base station according to an aspect of the present invention is a base station that communicates with a terminal. The base station includes a downlink control channel transmission unit that transmits a physical downlink control channel arranged in a physical downlink control channel region and an extended physical downlink control channel arranged in an extended physical downlink control channel region, which is different from the physical downlink control channel region. Each of resource block pairs in the extended physical downlink control channel region is divided into a plurality of partial resource block pairs. The extended physical downlink control channel is configured by one or more logical resource elements. Each set of K logical resource elements is mapped in each set of K partial resource block pairs. Each of the partial resource block pairs in each set of the partial resource block pairs is divided into K components in time and frequency directions. Each of the logical resource elements in each set of the logical resource elements is divided into K components and each of the K components obtained as a result of the division is mapped in each of K components obtained by dividing each of the partial resource block pairs. The plurality of components, namely the K components, obtained by dividing each of the logical resource elements are mapped in components obtained by dividing at least two different partial resource block pairs.

(13) In addition, a base station according to an aspect of the present invention is the above-described base station. A $k_2$-th component ($k_2$ is one of values of 1, 2, ..., and K) of a $k_1$-th logical resource element ($k_1$ is one of values of 1, 2, ..., and K) in each set of the logical resource elements is mapped in a $k_2$-th component of a $(\mathrm{mod}(k_1+k_2-2, K)+1)$-th partial resource block pair in each set of the partial resource block pairs.

(14) In addition, a base station according to an aspect of the present invention is a base station that communicates with a terminal. The base station includes a downlink control channel transmission unit that transmits a physical downlink control channel arranged in a physical downlink control channel region, a first extended physical downlink control channel arranged in an extended physical downlink control channel region, which is different from the physical downlink control channel region, and a second extended physical control channel arranged in the extended physical downlink control channel region, and a higher layer control information transmission unit that transmits higher layer control information that specifies monitoring of the second extended physical downlink control channel in the extended physical downlink control channel region. The physical downlink control channel and the second extended physical downlink control channel are provided with CRC bits scrambled by an identifier for broadcast information, and the first extended physical downlink control channel is provided with CRC bits scrambled by an identifier unique to the terminal.

(15) In addition, a base station according to an aspect of the present invention is a base station that communicates with a terminal. The base station includes a transmission unit that transmits a physical downlink control channel that is arranged in a physical downlink control channel region and that specifies transmission of broadcast information and/or an extended physical downlink control channel that is arranged in an extended physical downlink control channel region, which is different from the physical downlink control channel region, and that specifies the transmission of the broadcast information, and a higher layer control information transmission unit that transmits, to the terminal, higher layer control information that specifies monitoring in the extended physical downlink control channel region.

(16) In addition, a base station according to an aspect of the present invention is the above-described base station. The broadcast information is paging information.

(17) In addition, a base station according to an aspect of the present invention is the above-described base station. The broadcast information is system information.

(18) In addition, a base station according to an aspect of the present invention is the above-described base station. The extended physical downlink control channel region is configured in a physical downlink shared channel region.

(19) In addition, a base station according to an aspect of the present invention is the above-described base station. The extended physical downlink control channel is arranged in the extended physical downlink control channel region in a distributed manner.

(20) In addition, a base station according to an aspect of the present invention is the above-described base station. The higher layer control information indicates whether or not the extended physical downlink control channel is arranged in the extended physical downlink control channel region in a distributed manner.

(21) In addition, a communication system according to an aspect of the present invention is a communication system in which a terminal and a base station communicate with each other. The base station includes a downlink control channel transmission unit that transmits a physical downlink control channel arranged in a physical downlink control channel region, a first extended physical downlink control channel arranged in an extended physical downlink control channel region, which is different from the physical downlink control channel region, and a second extended physical downlink control channel arranged in the extended physical downlink control channel region, and a higher layer control information transmission unit that transmits higher layer control information that specifies monitoring of the second extended physical downlink control channel in the extended physical downlink control channel region. The terminal includes a downlink control channel detection unit that monitors the physical downlink control channel arranged in the physical downlink control channel region and the first extended physical downlink control channel arranged in the extended physical downlink control channel region, and a higher layer information obtaining unit that obtains the higher layer control information. In a case where the higher layer control information obtaining unit has obtained the higher layer control information, the downlink control channel detection unit monitors the second extended physical downlink control channel arranged in the extended physical downlink control channel region instead of the physical downlink control channel arranged in the physical downlink control channel region.

(22) In addition, a communication system to an aspect of the present invention is a communication system in which a terminal and a base station communicate with each other. The base station includes a transmission unit that transmits a physical downlink control channel that is arranged in a physical downlink control channel region and that specifies transmission of broadcast information and an extended physical downlink control channel that is arranged in an extended physical downlink control channel region, which is different from the physical downlink control channel region, and that specifies the transmission of the broadcast information, and a higher layer control information transmission unit that transmits, to the terminal, higher layer control information that specifies monitoring in the extended physical downlink control channel region. The terminal includes a downlink control channel detection unit that monitors the physical downlink control channel arranged in the physical downlink control channel region, and a higher layer control information obtaining unit that obtains the higher layer control information. In a case where the higher layer control information obtaining unit has obtained the higher layer control information, the downlink control channel detection unit monitors the extended physical downlink control channel arranged in the extended physical downlink control channel region instead of the physical downlink control channel arranged in the physical downlink control channel region.

(23) In addition, a communication method according to an aspect of the present invention is a communication method used by a terminal that communicates with a base station. The communication method includes the steps of monitoring a physical downlink control channel arranged in a physical downlink control channel region and a first extended physical downlink control channel arranged in an extended physical downlink control channel region, which is different from the physical downlink control channel region, obtaining higher layer control information that specifies monitoring of a second extended physical downlink control channel in the extended physical downlink control channel region, and monitoring, in a case where the higher layer control information has been obtained, the second extended physical downlink control channel arranged in the extended physical downlink control channel region instead of the physical downlink control channel arranged in the physical downlink control channel region.

(24) In addition, a communication method according to an aspect of the present invention is a communication method used by a terminal that communicates with a base station. The communication method includes the steps of monitoring a physical downlink control channel that is arranged in a physical downlink control channel region and that specifies transmission of broadcast information, obtaining higher layer control information that specifies monitoring in an extended physical downlink control channel region, which is different from the physical downlink control channel region, and monitoring, in a case where the higher layer control information has been obtained, an extended physical downlink control channel that is arranged in the extended physical downlink control channel region and that specifies the transmission of the broadcast information instead of the physical downlink control channel arranged in the physical downlink control channel region.

(25) In addition, a communication method according to an aspect of the present invention is a communication method used by a base station that communicates with a terminal. The communication method includes the steps of transmitting a physical downlink control channel arranged in a physical downlink control channel region, a first extended physical downlink control channel arranged in an extended physical downlink control channel region, which is different from the physical downlink control channel region, and a second extended physical downlink control channel arranged in the extended physical downlink control channel region, and transmitting higher layer control information that specifies monitoring of the second extended physical downlink control channel in the extended physical downlink control channel region. The physical downlink control channel and the second extended physical downlink control channel are provided with CRC bits scrambled by an identifier for broadcast information, and the first extended physical downlink control channel is provided with CRC bits scrambled by an identifier unique to the terminal.

(26) In addition, a communication method according to an aspect of the present invention is a communication method used by a base station that communicates with a terminal. The communication method includes the steps of transmitting a physical downlink control channel that is arranged in a physical downlink control channel region and that specifies transmission of broadcast information and/or an extended physical downlink control channel that is arranged in an extended physical downlink control channel region, which is different from the physical downlink control channel region, and that specifies the transmission of the broadcast information, and transmitting, to the terminal, higher layer control information that specifies monitoring in the extended physical downlink control channel region.

Advantageous Effects of Invention

According to the present invention, in a radio communication system in which a base station and a terminal communicate with each other, physical uplink control channel resources can be efficiently specified not only when the base station transmits control information intended for the terminal using a physical downlink control channel but also when the base station transmits the control information using an extended physical downlink control channel.

DESCRIPTION OF EMBODIMENTS

First Embodiment

A first embodiment of the present invention will be described hereinafter. A communication system according to the first embodiment includes a base station (a base station device, a downlink transmission device, an uplink reception device, or an eNodeB) and a terminal (a terminal device, a mobile station device, a downlink reception device, an uplink transmission device, or UE).

Figure 1:
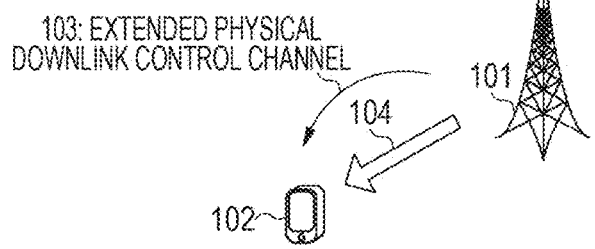
FIG. 1 is a diagram illustrating an example of the configuration of a communication system according to a first embodiment of the present invention.

FIG. 1 is a diagram illustrating an example of the configuration of the communication system according to the first embodiment. In FIG. 1, a base station 101 transmits control information regarding downlink transmission data 104 to a terminal 102 through a PDCCH and/or an extended physical downlink control channel (E-PDCCH; enhanced PDCCH) 103. First, the terminal 102 detects the control information, and when the control information has been detected, extracts the downlink transmission data 104 in the same subframe using the detected control information. The downlink transmission data might be transmission data (dedicated information) intended for the terminal 102 or might be transmission data (broadcast information) shared by a plurality of terminals, such as paging or system information.

Control channels specifying the transmission data are masked by RNTIs (radio network temporary identities), which are identifiers specified by the base station 101 in advance. More specifically, in the case of an extended physical downlink control channel (first extended physical downlink control channel) specifying transmission data intended for the terminal 102, bit sequences indicating RNTIs (a C-RNTI (Cell RNTI), an SPS C-RNTI (Semi-Persistent Scheduling C-RNTI), and the like) assigned to the terminal 102 are used as check bits (CRC bits or CRC check bits) of CRC (cyclic redundancy check). Therefore, only the terminal 102 can read the transmission data intended for the terminal 102. In addition, in the case of transmission data shared by a plurality of terminals, a control channel is masked by RNTIs for shared transmission data. More specifically, in the case of an extended physical downlink control channel (second extended physical downlink control channels) specifying paging information, system information, a random access response, and the like, bit sequences indicating a P-RNTI (Paging RNTI), an SI-RNTI (System Information RNTI), and an RA-RNTI (Random Access RNTI), respectively, are used as check bits of the CRC. Terminal-specific identifiers such as the C-RNTI and the SPS C-RNTI are transmitted from the base station 101 to each terminal 102 in advance, whereas identifiers for broadcast information such as the P-RNTI and the SI-RNTI are configured in a shared or fixed manner so that each terminal 102 can read the same paging information, system information, and random access response.

Figure 2:
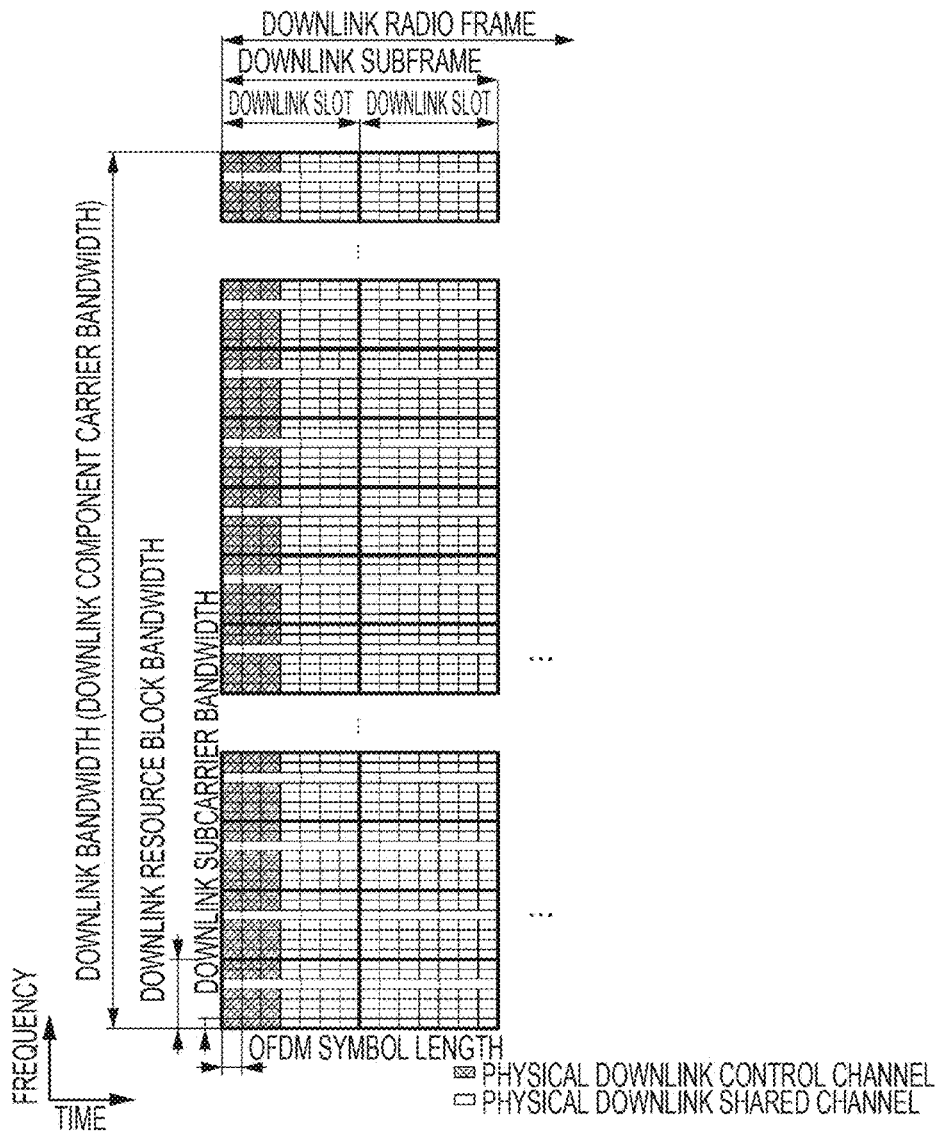
FIG. 2 is a diagram illustrating an example of the configuration of a downlink radio frame according to the embodiment.

FIG. 2 is a diagram illustrating an example of the configuration of a downlink radio frame according to this embodiment. An OFDM access scheme is used for a downlink. In the downlink, the PDCCH, a physical downlink shared channel (PDSCH), and the like are assigned. The downlink radio frame is configured by downlink resource block (RB) pairs. The downlink RB pair is a unit of assignment of downlink radio resources and the like, and is configured by a frequency band (RB bandwidth) and a time band (two slots=one subframe) having predetermined widths. Each downlink RB pair is configured by two continuous downlink RBs (RB bandwidth×slots) in a time domain. Each downlink RB is configured by twelve subcarriers in a frequency domain and seven OFDM symbols in the time domain. A region defined by one subcarrier in the frequency domain and one OFDM symbol in the domain will be referred to as a resource element (RE). The physical downlink control channel is a physical channel through which downlink control information such as a terminal device identifier, scheduling information regarding the physical downlink shared channel, scheduling information regarding a physical uplink shared channel, a modulation scheme, a coding rate, and a retransmission parameter is transmitted. It is to be noted that although the downlink subframe in one component carrier (CC) has been described here, the downlink subframe is defined in each CC and these downlink subframes are substantially synchronized with one another between the CCs.

Figure 3:
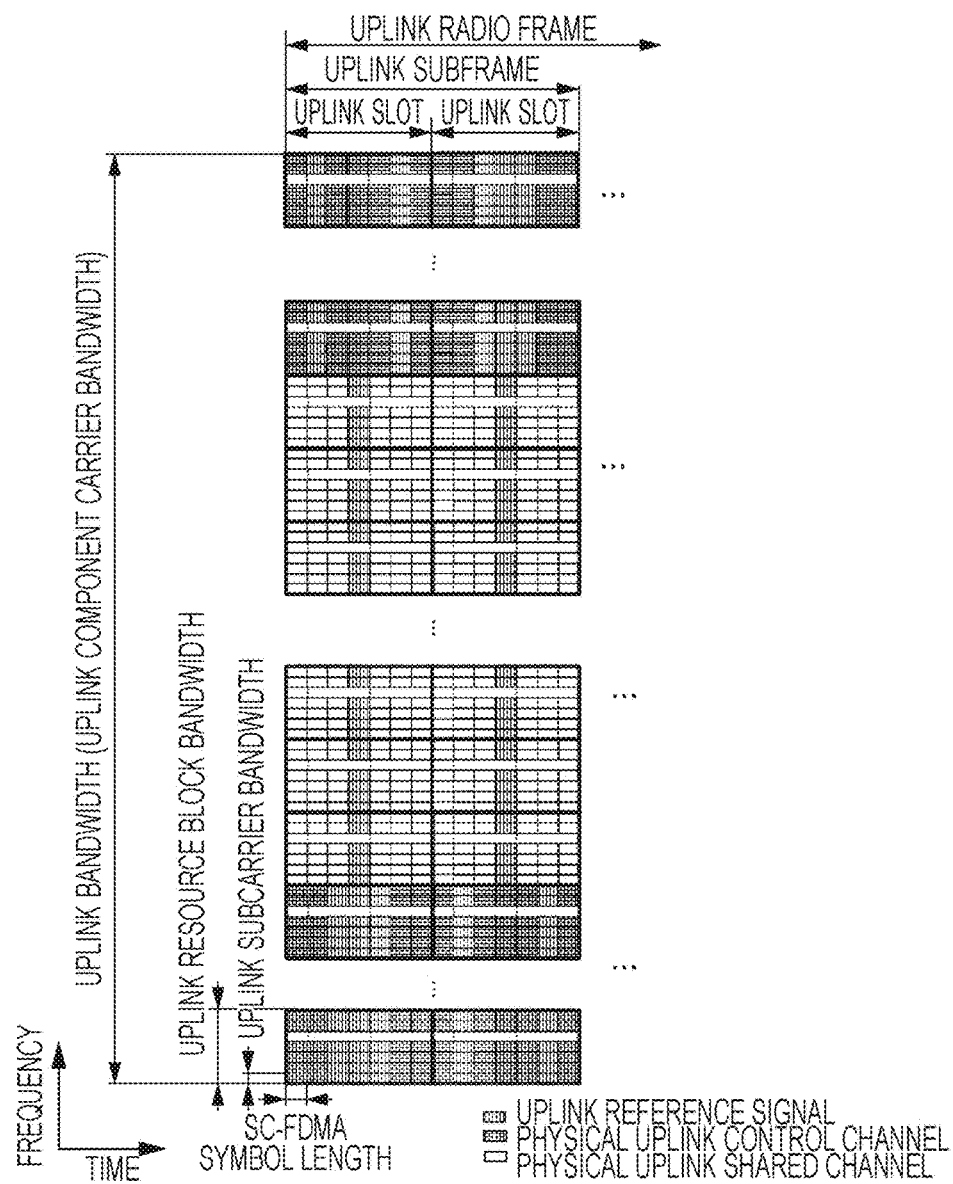
FIG. 3 is a diagram illustrating an example of the configuration of an uplink radio frame according to the embodiment.

FIG. 3 is a diagram illustrating an example of the configuration of an uplink radio frame according to this embodiment. An SC-FDMA scheme is used for an uplink. In the uplink, a physical uplink shared channel (PUSCH), a PUCCH, and the like are assigned. In addition, uplink reference signals are assigned to part of the PUSCH and the PUCCH. An uplink radio frame is configured by uplink RB pairs. The uplink RB pair is a unit of assignment of uplink radio resources and the like, and is configured by a frequency band (RB bandwidth) and a time band (two slots=one subframe) having predetermined widths. Each uplink RB pair is configured by two continuous uplink RBs (RB bandwidth×slots) in the time domain. One uplink RB is configured by twelve subcarriers in the frequency domain and seven OFDM symbols in the time domain. It is to be noted that although the uplink subframe in one CC has been described here, the uplink subframe is defined in each CC.

Figure 4:
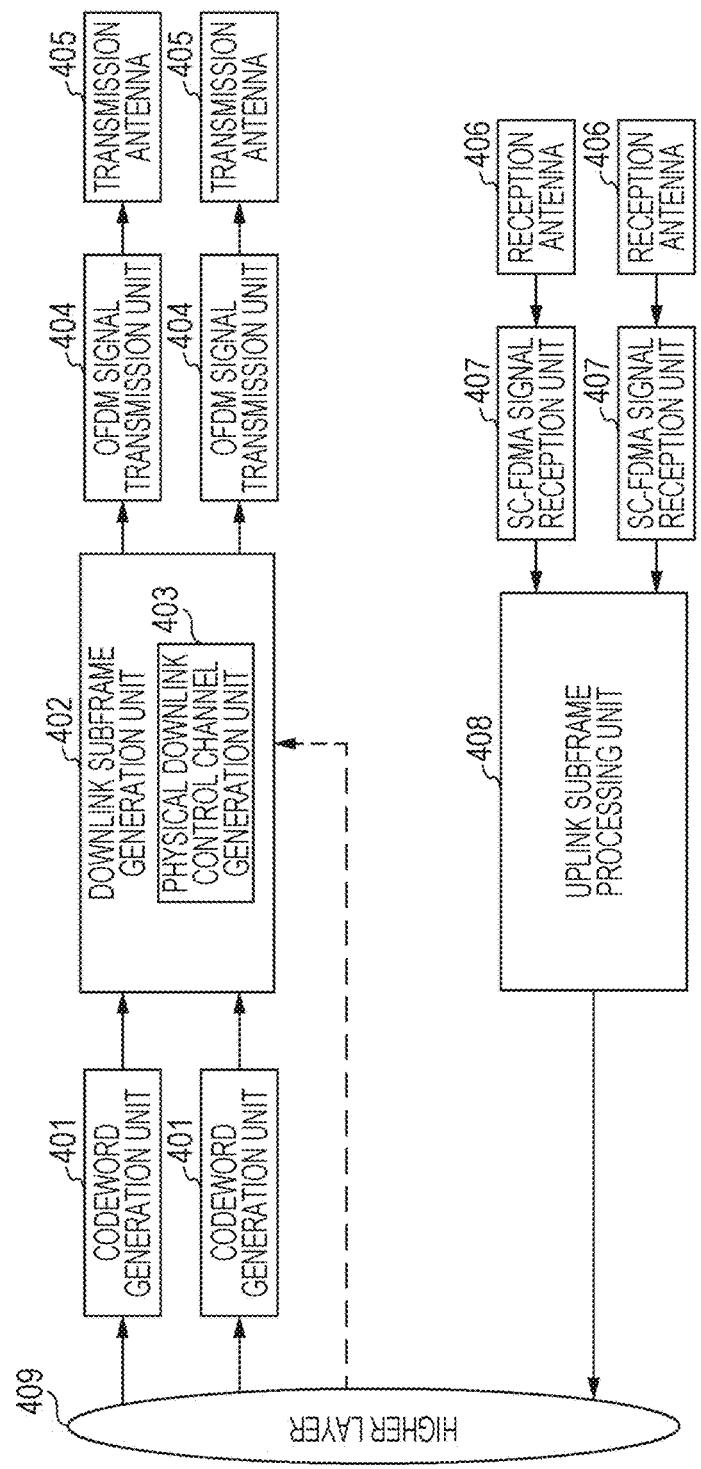
FIG. 4 is a schematic diagram illustrating an example of the block configuration of a base station according to the embodiment.

FIG. 4 is a schematic diagram illustrating an example of the block configuration of the base station 101 according to this embodiment. The base station 101 includes codeword generation units 401, a downlink subframe generation unit 402, OFDM signal transmission units (downlink control channel transmission units) 404, transmission antennas (base station transmission antennas) 405, reception antennas (base station reception antennas) 406, SC-FDMA signal reception units 407, an uplink subframe processing unit 408, and a higher layer (higher layer control information transmission unit) 409. The downlink subframe generation unit 402 includes a physical downlink control channel generation unit 403.

Figure 5:
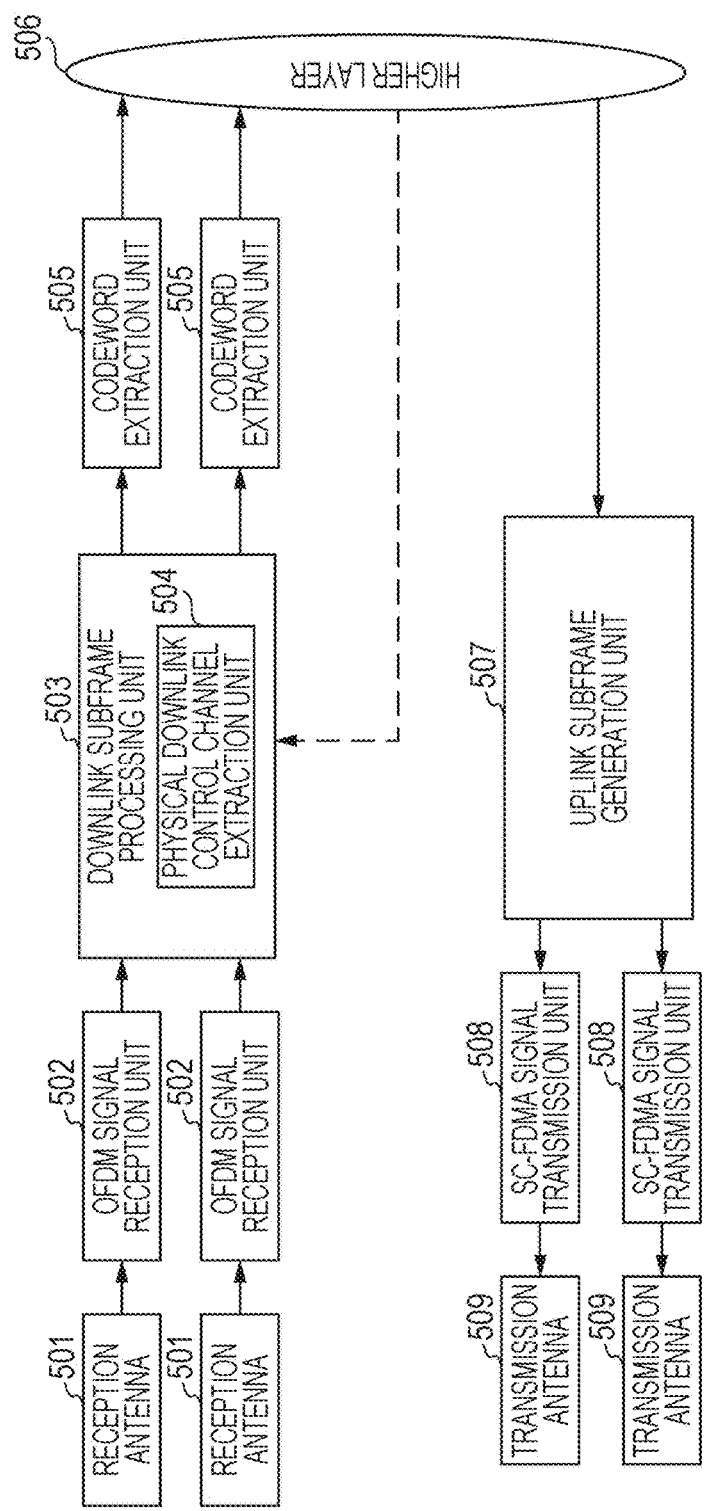
FIG. 5 is a schematic diagram illustrating an example of the block configuration of a terminal according to the embodiment.

FIG. 5 is a schematic diagram illustrating an example of the block configuration of the terminal 102 according to this embodiment. The terminal 102 includes reception antennas (terminal reception antennas) 501, OFDM signal reception units (downlink reception units) 502, a downlink subframe processing unit 503, codeword extraction units (data extraction units) 505, a higher layer (higher layer control information obtaining unit) 506, an uplink subframe generation unit 507, SC-FDMA signal transmission units 508, and transmission antennas (terminal transmission antennas) 509. The downlink subframe processing unit 503 includes a physical downlink control channel extraction unit (downlink control channel detection unit) 504.

First, a procedure for transmitting and receiving downlink data will be described with reference to FIG. 4 and FIG. 5. In the base station 101, transmission data (also referred to as transport blocks) transmitted from the higher layer 409 is subjected to processes such as error correction coding and a rate matching process in the codeword generation units 401, and codewords are generated. This downlink transmission data might be transmission data intended for the terminal 102 or might be transmission data shared by a plurality of terminals, such as paging or system information. In one subframe in one cell, a maximum of two codewords are simultaneously transmitted. In the downlink subframe generation unit 402, a downlink subframe is generated on the basis of an instruction from the higher layer 409. First, the codewords generated by the codeword generation units 401 are converted into modulation symbol sequences by a modulation process such as PSK (phase-shift keying) modulation or QAM (quadrature amplitude modulation) modulation. In addition, the modulation symbol sequences are mapped in REs of some RBs, and then a downlink subframe for each antenna port is generated by a precoding process. It is to be noted that the downlink REs are defined in accordance with subcarriers of each OFDM symbol. At this time, a transmission data sequence transmitted from the higher layer 409 includes control information (higher layer control information) for RRC (radio resource control) signaling. In addition, the physical downlink control channel generation unit 403 generates a physical downlink control channel. Here, control information (downlink control information or a downlink grant) included in the physical downlink control channel includes information such as an MCS (modulation and coding scheme) indicating a downlink modulation scheme, downlink resource assignment indicating RBs used for transmitting data, HARQ control information (a redundancy version, an HARQ process number, and a new data indicator) used for controlling the HARQ, and a PUCCH-TPC (transmission power control) command used for closed loop transmission power control of the PUCCH. The downlink subframe generation unit 402 masks the physical downlink control channel using the RNTIs on the basis of an instruction from the higher layer 410 or in accordance with the type of downlink transmission data, and maps the physical downlink control channel in the REs of the downlink subframe. The downlink subframe for each antenna port generated by the downlink subframe generation unit 402 is modulated into an OFDM signal by each OFDM signal transmission unit 404, and transmitted through each transmission antenna 405.

In the terminal 102, the OFDM signal is received by each OFDM signal reception unit 502 through each reception antenna 501, and subjected to an OFDM demodulation process. First, the downlink subframe processing unit 503 detects a PDCCH (first downlink control channel) or an E-PDCCH (second downlink control channel) in the physical downlink control channel extraction unit 504. More specifically, the physical downlink control channel extraction unit 504 decodes a region (first downlink control channel region) in which the PDCCH can be arranged or a region (second downlink control channel region, or potential PDCCH) in which the E-PDCCH can be arranged, and checks the check bits of CRC added in advance (blind decoding). That is, the physical downlink control channel extraction unit 504 monitors the PDCCH arranged in a PDCCH region and the E-PDCCH arranged in a PDSCH region, which is different from the PDCCH region. If the CRC check bits match with an ID (RNTI) assigned from the base station in advance, the downlink subframe processing unit 503 determines that the PDCCH or the E-PDCCH has been detected, and extracts a PDSCH using control information included in the detected PDCCH or E-PDCCH. More specifically, an RE demapping process, a demodulation process, and the like corresponding to the RE mapping process and the modulation process performed by the downlink subframe generation unit 402 are performed. The PDSCH extracted from the received downlink subframe is transmitted to the codeword extraction units 505. The codeword extraction units 505 perform a rate matching process, error correction decoding, and the like corresponding to the rate matching process and the error correction coding, and the transport blocks are extracted and transmitted to the higher layer 506. That is, when the physical downlink control channel extraction unit 504 has detected the PDCCH or the E-PDCCH, the codeword extraction units 505 extract transmission data in the PDSCH relating to the detected PDCCH or E-PDCCH, and transmits the transmission data to the higher layer 506.

Next, a procedure for transmitting and receiving uplink transmission data will be described. In the terminal 102, the uplink subframe generation unit 507 maps uplink transmission data transmitted from the higher layer 506 in RBs of an uplink subframe. Each SC-FDMA signal transmission unit 508 performs SC-FDMA modulation on the uplink subframe to generate an SC-FDMA signal, and transmits the SC-FDMA through each transmission antenna 509.

In the base station 101, the SC-FDMA signal is received by each SC-FDMA signal reception unit 407 through each reception antenna 406, and subjected to an SC-FDMA demodulation process. The uplink subframe processing unit 408 extracts the uplink transmission data from the RBs in which the uplink transmission data is mapped, and transmits the extracted uplink transmission data to the higher layer 409.

Figure 6:
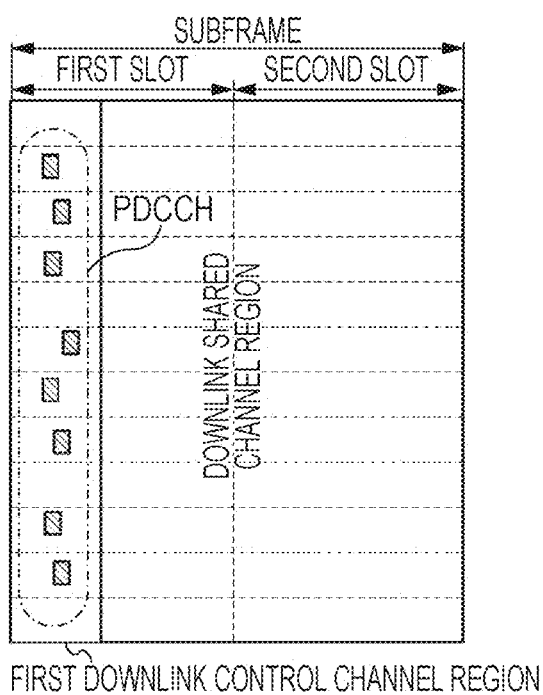
FIG. 6 is a diagram illustrating a PDCCH region and a PDSCH region according to the embodiment.

Next, the PDCCH will be described. FIG. 6 is a diagram illustrating the PDCCH region and the PDSCH region. The PDCCH, which is the first control channel, is arranged in first to third OFDM symbols in a subframe. The first control channel is arranged over the entirety of a system bandwidth in the frequency direction. In addition, the shared channel is arranged in OFDM symbols other than those for the first control channel in the subframe. The PDCCH is configured by a plurality of control channel elements (CCEs). The number of CCEs used in each downlink component carrier depends on a downlink component carrier bandwidth, the number of OFDM symbols configuring the PDCCH, and the number of transmission ports for downlink reference signals according to the number of transmission antennas of a base station used for communication. Each CCE is configured by a plurality of downlink resource elements (a resource defined by one OFDM symbol and one subcarrier).

The CCEs used between a base station and a terminal are provided with numbers for identifying the CCEs. Numbering of the CCEs is performed on the basis of a predetermined rule. Here, CCE_t indicates a CCE having a CCE number t. Each PDCCH is configured by an aggregation (CCE aggregation) including a plurality of CCEs. The number of CCEs configuring the aggregation will be referred to as a "CCE aggregation level". The CCE aggregation level of each PDCCH is set by a base station in accordance with a coding rate set for each PDCCH and the number of DCI bits included in each PDCCH. It is to be noted that a combination of CCE aggregation levels that can be used for a terminal is predetermined. In addition, an aggregation including n CCEs will be referred to as a "CCE aggregation level n".

Each resource element group is configured by four contiguous downlink resource elements in the frequency domain. Furthermore, each CCE is configured by nine different discrete resource element groups in the frequency domain and the time domain. More specifically, all numbered resource element groups are interleaved one by one using a block interleaver in the entirety of the downlink component carrier. Nine resource element groups after the interleaving having consecutive numbers configure one CCE.

SSs (search spaces), which are spaces (search spaces or retrieval spaces) searched for PDCCHs, are configured for each terminal. Each SS is configured by a plurality of CCEs. Numbers are given to the CCEs in advance, and each SS is configured by a plurality of CCEs having consecutive numbers. The number of CCEs configuring a certain SS is predetermined. Each SS having a CCE aggregation level is configured by a group of a plurality of candidates for a PDCCH. The SSs are classified into cell-specific search spaces CSSs (cell-specific SSs), in which, among the CCEs configuring the SSs, smallest CCE numbers are the same in a cell, and terminal-specific search spaces USSs (UE-specific SSs), in which smallest CCE numbers are specific to terminals. In each CSS, a PDCCH to which (in which) control information read by a plurality of terminals, such as system information or information regarding paging, is assigned (included) or a PDCCH to which (in which) a downlink/uplink grant indicating an instruction to perform fallback to a lower transmission scheme or random access is assigned (included) can be arranged.

A base station transmits a PDCCH using one or more CCEs in each SS configured in a terminal. The terminal decodes a received signal using the one or more CCEs in each SS, and performs a process for detecting the PDCCH intended therefor (referred to as blind decoding). The terminal configures a different SS for each CCE aggregation level. Thereafter, the terminal performs the blind decoding using a predetermined combination of CCEs in an SS different for each CCE aggregation level. In other words, the terminal performs the blind decoding on each candidate for the PDCCH in an SS different for each CCE aggregation level. This series of processes will be referred to as monitoring of a PDCCH.

The base station arranges a PDCCH (PDCCH that specifies transmission data shared by a plurality of terminals) that specifies paging information, system information, a random access response, or the like in a CSS. In addition, the terminal monitors (checks the blind decoding and the CRC check bits) a PDCCH in a CSS using the P-RNTI, the SI-RNTI, the RA-RNTI, or the like.

Figure 7:
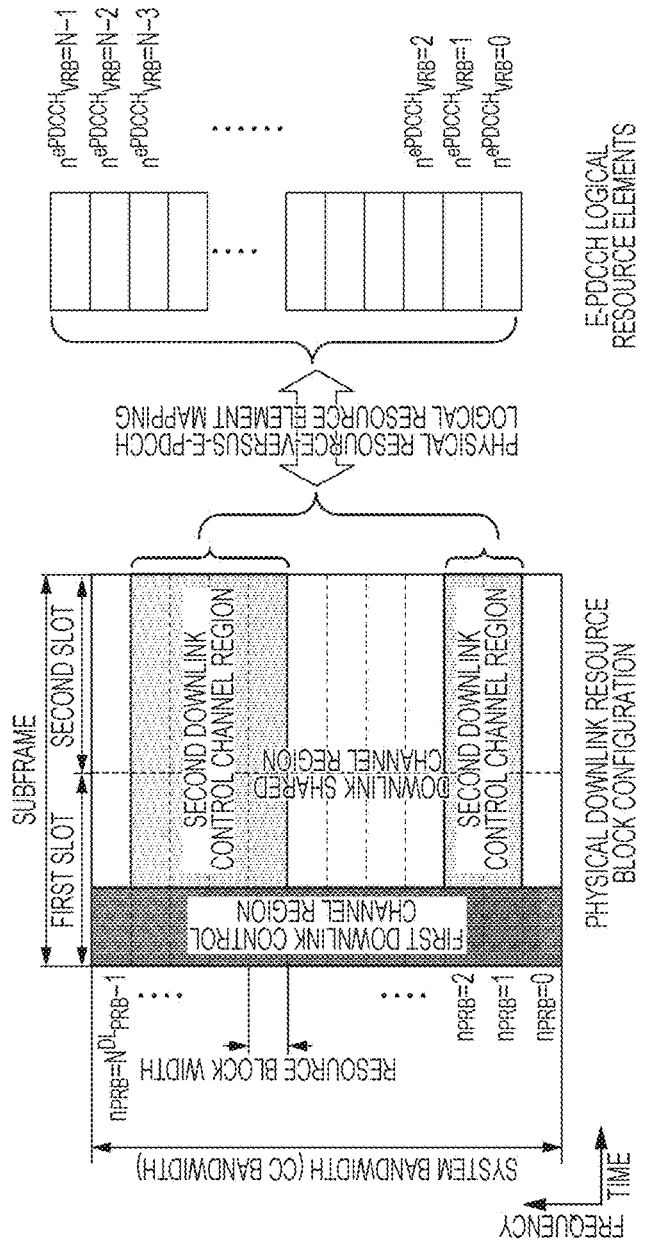
FIG. 7 is a diagram illustrating E-PDCCH regions and physical resource blocks PRB and E-PDCCH logical resource elements in the PDSCH region according to the embodiment.

Next, the E-PDCCH will be described. FIG. 7 is a diagram illustrating E-PDCCH regions and physical resource blocks PRB (physical RBs) and E-PDCCH logical resource elements in the PDSCH region. RBs in an actual subframe are referred to as PRBs. In addition, RBs that are logical resources used for assigning RBs are referred to as VRBs (virtual RBs). It is to be noted that although a case in which the VRBs are the E-PDCCH logical resources elements will be described hereinafter, the E-PDCCH logical resource elements are not limited to this.

The E-PDCCH is arranged in OFDM symbols other than those for the PDCCHs (however, some OFDM symbols may be used for both). The E-PDCCH is subjected to frequency multiplexing along with the PDSCH. In addition, resource blocks in which the E-PDCCH can be arranged are configured for each terminal. In addition, a start position of the OFDM symbols in which the E-PDCCH is arranged may be determined using the same method as that for the shared channel or an independent method.

$N^{DL}_{PRB}$ denotes the number of PRBs arranged in a downlink CC in the frequency direction. The PRBs (or PRB pairs) are provided with numbers $n_{PRB}$, which are 0, 1, 2, . . . , and $N^{DL}_{PRB}-1$ in ascending frequency order. If the number of VRBs arranged in the downlink CC in the frequency direction is denoted by N, the E-PDCCH logical resource elements are provided with numbers $n_{VRB}$, which are 0, 1, 2, . . . , and N−1 in ascending frequency order. Each of the PRBs and each of the E-PDCCH logical resource elements are explicitly or implicitly mapped. It is to be noted that the numbers mentioned here may be expressed as indices.

Figure 8:
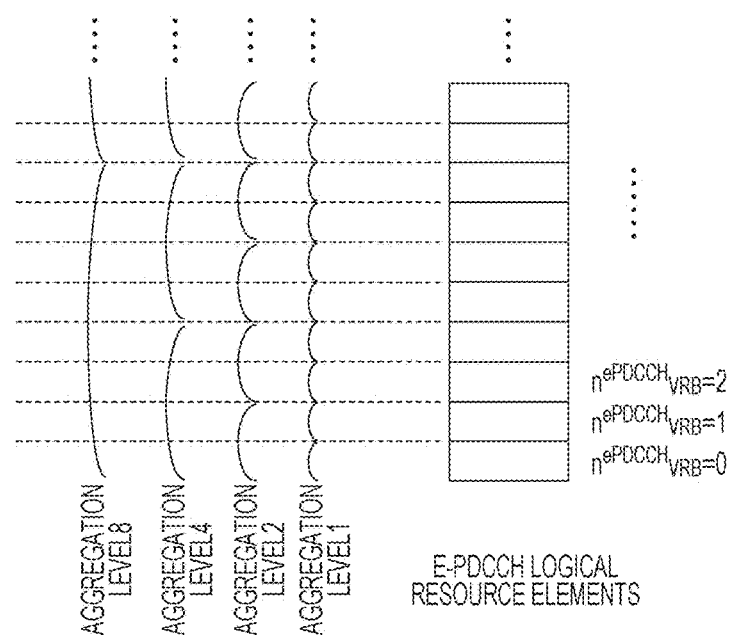
FIG. 8 is a diagram illustrating examples of an aggregation of E-PDCCH logical resources according to the embodiment.

As with the PDCCH, the E-PDCCH is configured by an aggregation including a certain number (aggregation level) of E-PDCCH logical resource elements. FIG. 8 is a diagram illustrating examples of the aggregation of E-PDCCH logical resources. Here, four types of aggregation level, namely Aggregation Level 1 to Aggregation Level 8, are illustrated, in which one E-PDCCH is configured by one to eight E-PDCCH logical resource elements.

Figure 9:
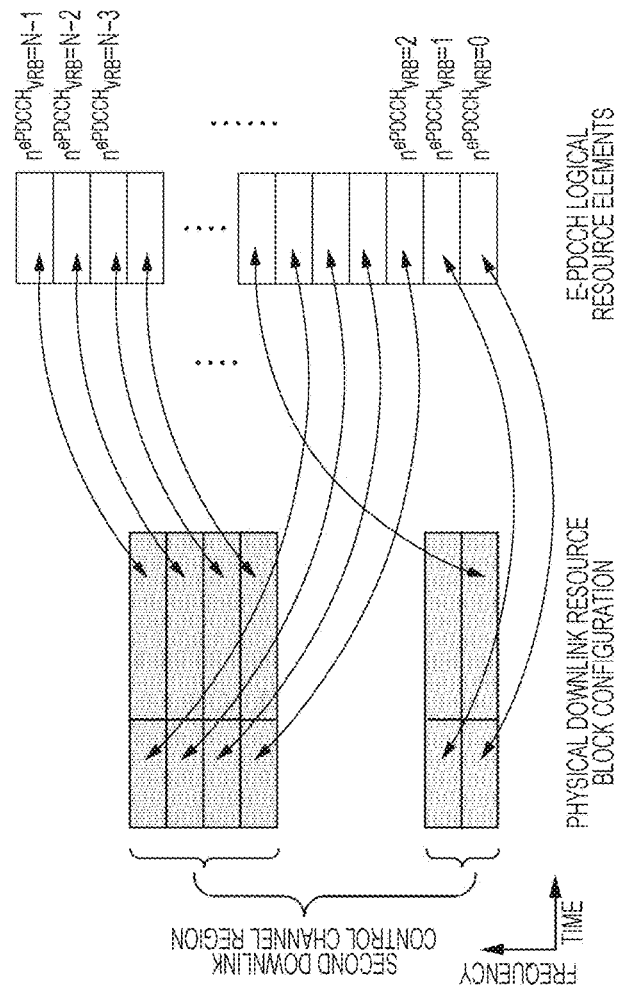
FIG. 9 is a diagram illustrating an example of mapping of the PRBs and the E-PDCCH logical resource elements in the E-PDCCH regions and the PDSCH region according to the embodiment.

FIG. 9 is a diagram illustrating an example of mapping of PRBs and E-PDCCH logical resource elements in the E-PDCCH regions and the PDSCH region. According to this PRB-versus-E-PDCCH logical resource element mapping scheme, each E-PDCCH logical resource element is mapped in each PRB. First, in accordance with an increase in $n_{PRB}$ of the PRBs in the first slot, the PRBs and the E-PDCCH logical resource elements are mapped such that $n_{VRB}$, increases. Next, in accordance with an increase in $n_{PRB}$ of the PRBs in the second slot, the PRBs and the E-PDCCH logical resource elements are mapped such that $n_{VRB}$ increases. That is, in the PRBs, a loop of $n_{PRB}$ is processed inside a loop of the slots. Alternatively, although not illustrated here, the PRBs and the E-PDCCH logical resource elements may be mapped in the first slot and then in the second slot such that $n_{VRB}$ increases, and thereafter the PRBs and the E-PDCCH logical resource elements may be mapped in the next first slot such that $n_{PRB}$ increases. That is, in the PRBs, the loop of the slots may be processed inside the loop of $n_{PRB}$.

Thus, by mapping each E-PDCCH logical resource element in each PRB, the E-PDCCH can be locally arranged along a frequency axis (Resource Assignment Type 1). Such transmission of the E-PDCCH using mapping that enables localized transmission of the E-PDCCH will be referred to as localized E-PDCCH transmission (first E-PDCCH transmission). According to the localized E-PDCCH transmission, the E-PDCCH can be transmitted in a frequency-selective fading environment using a frequency channel whose quality is desirable. Therefore, high gain can be obtained when the frequency selectivity of a channel is known.

On the other hand, by mapping each E-PDCCH logical resource element in a plurality of PRBs, the E-PDCCH can be arranged in a distributed manner (Resource Assignment Type 2). Such transmission of the E-PDCCH using mapping that enables distributed transmission of the E-PDCCH will be referred to as distributed E-PDCCH transmission (second E-PDCCH transmission). In the following description, PRB-versus-E-PDCCH logical resource element mapping in the case of the distributed E-PDCCH transmission will be described. According to the distributed E-PDCCH transmission, a large frequency diversity effect can be obtained in a frequency-selective fading environment. Therefore, gain independent of the frequency selectivity of a channel can be obtained.

Figure 10:
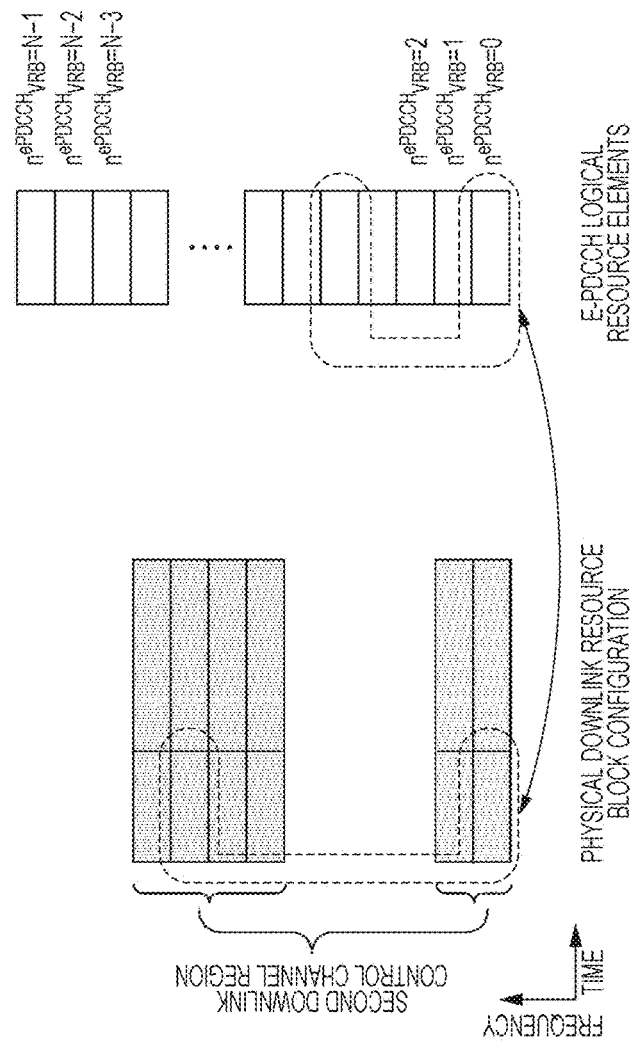
FIG. 10 is a diagram illustrating another example of the mapping of the PRBs and the E-PDCCH logical resource elements in the E-PDCCH regions and the PDSCH region according to the embodiment.

FIG. 10 is a diagram illustrating another example of the mapping of the PRBs and the E-PDCCH logical resource elements in the E-PDCCH regions and the PDSCH region. According to this PRB-versus-E-PDCCH logical resource element mapping scheme, each set of a plurality of E-PDCCH logical resource elements is mapped in each set of a plurality of PRBs. Although mapping of one combination in one combination is illustrated here, this is just mapping of one of a plurality of combinations in one of a plurality of combinations, and there are other combinations of E-PDCCH logical resource elements and other combinations of PRBs. In addition, although a case in which a plurality of PRBs in the first slot are combined as a set of RPBs is illustrated, combinations of PRBs are not limited to this. A plurality of PRBs in the second slot may be combined, or a PRB in the first slot and a PRB in the second slot may be combined. In addition, although a case in which the number of elements configuring a combination remains the same, namely two, has been described, the number of elements configuring a combination is not limited to this. For example, the number of E-PDCCH logical resource elements may be increased so that a set of four E-PDCCH logical resource elements is mapped in a set of two PRBs, or the number of PRBs may be increased so that a set of two E-PDCCH logical resource elements is mapped in a set of four PRBs. In addition, the number of PRBs and the number of E-PDCCH logical resource elements may both be three or more, not two.

Figure 11:
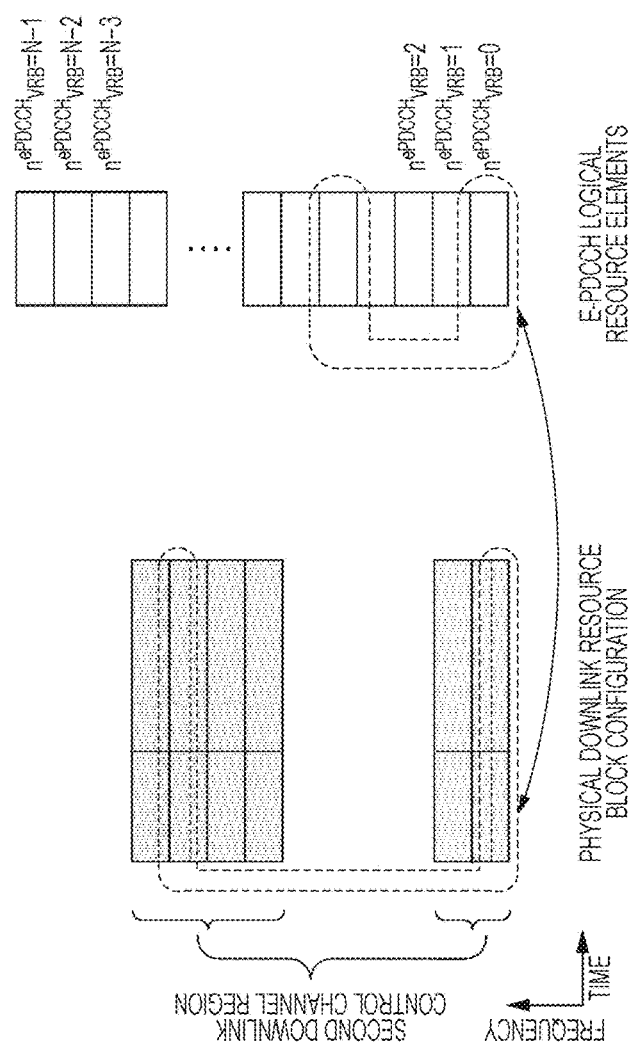
FIG. 11 is a diagram illustrating another example of the mapping of the PRBs and the E-PDCCH logical resource elements in the E-PDCCH regions and the PDSCH region according to the embodiment.

FIG. 11 is a diagram illustrating another example of mapping of the PRBs and the E-PDCCH logical resource elements in the E-PDCCH regions and the PDSCH region. According to this PRB-versus-E-PDCCH logical resource element mapping scheme, each set of a plurality of E-PDCCH logical resource elements is mapped in each set of a plurality of partial PRB pairs. A difference between FIG. 11 and FIG. 10 is that the PRBs are changed to the PRB pairs. Here, each partial PRB pair is a region obtained by dividing one PRB pair in the frequency direction and/or a time direction. It is to be noted that although an example in which each PRB pair is divided into two in the frequency direction is illustrated in FIG. 11, the partial PRB pairs are not limited to this. It is only required that each partial PRB pair be a region obtained by dividing one PRB pair in the frequency direction and/or the time direction. In this sense, the PRBs can be regarded as partial PRB pairs divided in the time direction.

Figure 12:
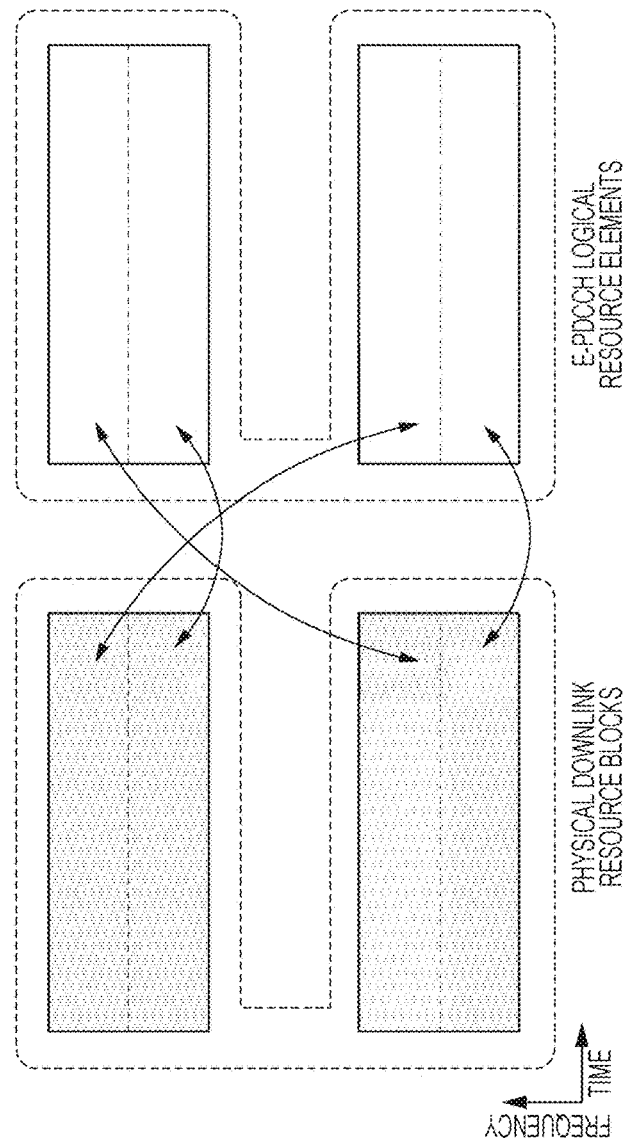
FIG. 12 is a diagram illustrating an example of mapping of REs and the E-PDCCH logical resource elements according to the embodiment.

Next, mapping of the REs and the E-PDCCH logical resource elements when each set of a plurality of E-PDCCH logical resource elements is mapped in each set of a plurality of partial PRB pairs (include PRBs) will be described. FIG. 12 is a diagram illustrating an example of the mapping of the REs and the E-PDCCH logical resource elements. Each E-PDCCH logical resource element and each partial PRB pair are divided into a plurality of components. In particular, each partial PRB pair is divided in the frequency direction.

The plurality of components obtained by dividing each E-PDCCH logical resource element are mapped in part of at least two different partial PRB pairs.

Figure 13:
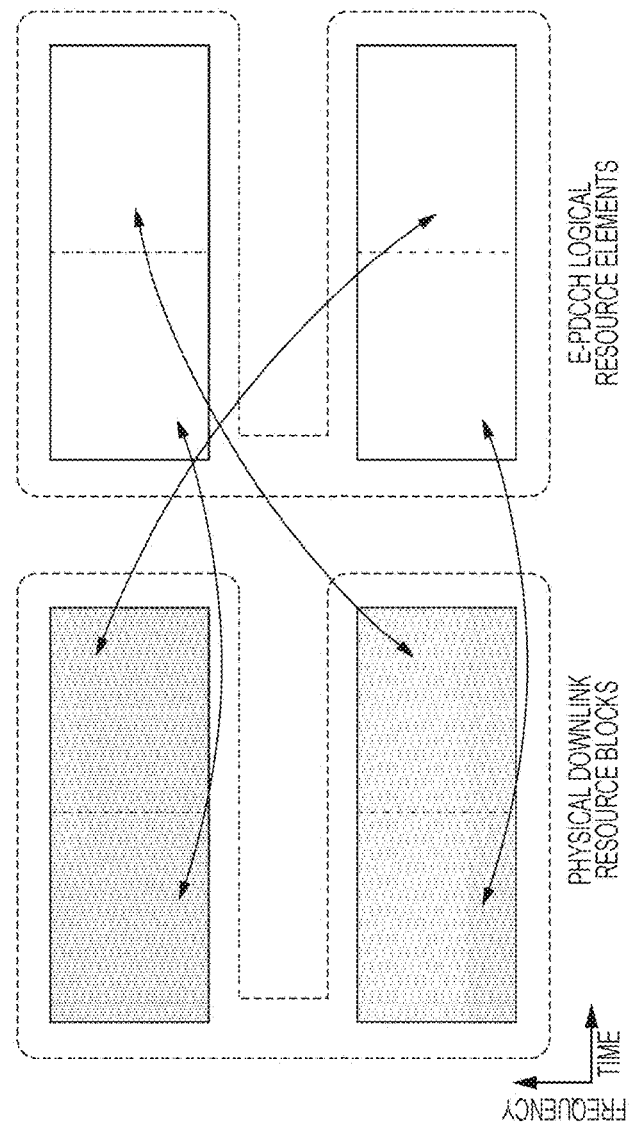
FIG. 13 is a diagram illustrating another example of the mapping of the REs and the E-PDCCH logical resource elements according to the embodiment.

FIG. 13 is a diagram illustrating another example of the mapping of the REs and the E-PDCCH logical resource elements. Each E-PDCCH logical resource element and each partial PRB pair are divided into a plurality of components. In particular, each partial PRB pair is divided in the time direction. As in FIG. 12, the plurality of components obtained by dividing each E-PDCCH logical resource element are mapped in part of at least two different partial PRB pairs.

Figure 14:
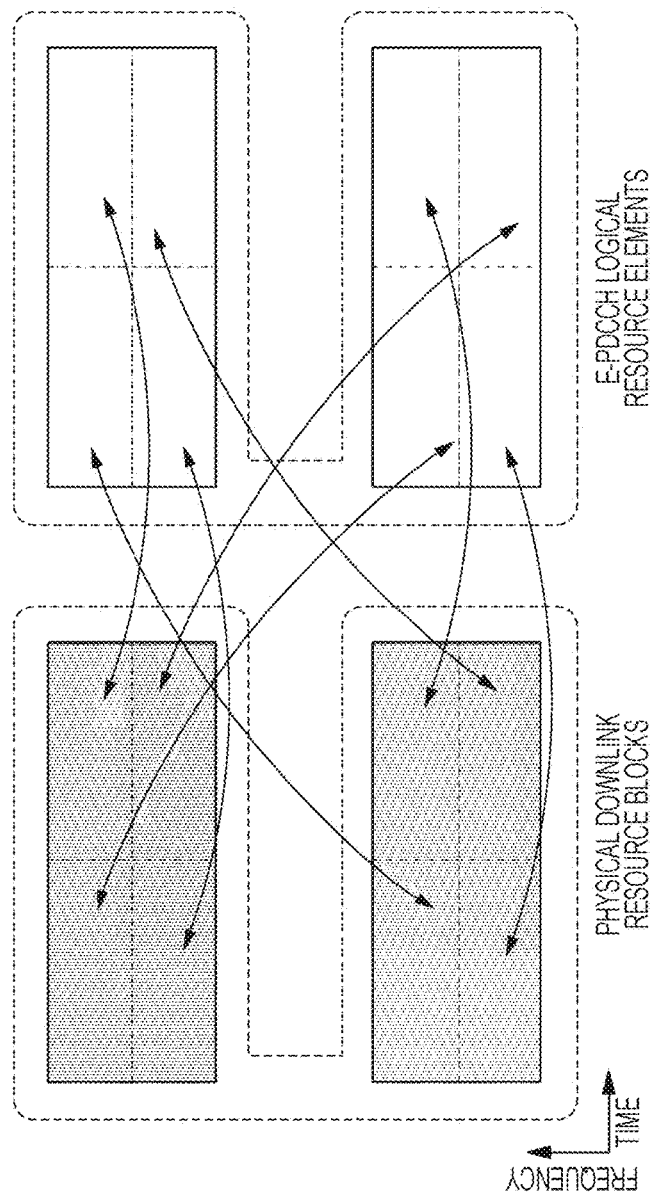
FIG. 14 is a diagram illustrating another example of the mapping of the REs and the E-PDCCH logical resource elements according to the embodiment.

FIG. 14 is a diagram illustrating another example of the mapping of the REs and the E-PDCCH logical resource elements. Each E-PDCCH logical resource element and each partial PRB pair are divided into a plurality of components. In particular, each partial PRB pair is divided in the time and frequency directions. As in FIG. 12 and FIG. 13, the plurality of components obtained by dividing each E-PDCCH logical resource element are mapped in part of at least two different partial PRB pairs.

In the mapping of the REs and the E-PDCCH logical resource elements illustrated in FIG. 12 to FIG. 14, the number of components of each E-PDCCH logical resource element and the number of components of each partial PRB pair obtained as a result of the division are preferably the same, namely K. A k-th component (k is one of values of 1, 2, . . . , and K) among the K components obtained by dividing an arbitrary E-PDCCH logical resource element is preferably mapped in a k-th component among the K components obtained by dividing each partial PRB pair.

More preferably, the number of components of each E-PDCCH logical resource element and the number of components of partial PRB pairs obtained as a result of the division are the same as the number of E-PDCCH logical resource elements in one combination and the number of PRB pairs in one combination, namely K. A $k_2$-th component ($k_2$ is one of values of 1, 2, . . . , and K) among the K components obtained by dividing a $k_1$-th E-PDCCH logical resource element ($k_1$ is one of values of 1, 2, . . . , and K) in one combination is mapped in a $k_2$-th component among the K components obtained by dividing a mod($k_1+k_2-2$, K)+1-th partial PRB pair in one combination. Here, mod denotes a remainder function.

The localized E-PDCCH transmission and the distributed E-PDCCH transmission have been described above. Next, a procedure for transmitting transmission data from a base station to a terminal will be described while particularly focusing on a case in which transmission data shared by a plurality of terminals (transmission data to be broadcast) is transmitted.

Figure 15:
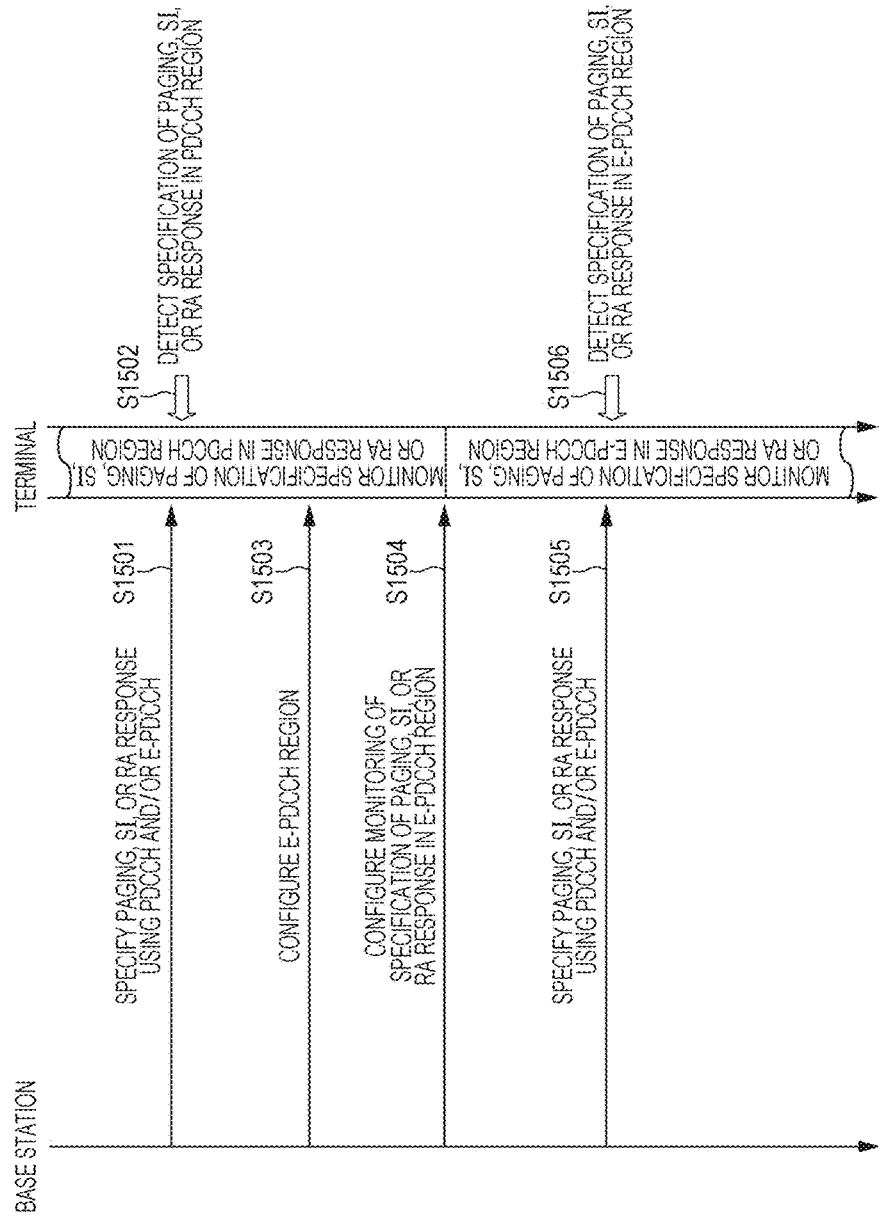
FIG. 15 is a diagram illustrating a procedure for transmitting downlink data from the base station to the terminal according to the embodiment.

FIG. 15 is a diagram illustrating a procedure for transmitting downlink data from the base station 101 to the terminal 102. After initial access, the terminal 102 monitors a PDCCH (specification of paging, SI, an RA response, or the like) that specifies transmission data to be broadcast (paging, system information, a random access response, or the like) in the PDCCH region. When it is necessary to transmit transmission data to be broadcast (paging, system information, a random access response, or the like), the base station 101 transmits a PDCCH that specifies (determines) the transmission data to be broadcast at least in the PDCCH region (S1501). Alternatively, the base station 101 may transmit an E-PDCCH that specifies (determines) the transmission data to be broadcast in the E-PDCCH region (S1501). It is to be noted that although timings of specification using a PDCCH and specification using an E-PDCCH seem to be the same in the figure, the timings are not limited to this.

Since the terminal 102 is monitoring a PDCCH that specifies transmission data to be broadcast in the PDCCH region, the terminal 102 detects the PDCCH transmitted from the base station 101 (S1502).

The base station 101 transmits control information that specifies (configures and transmits) an E-PDCCH region to the terminal 102 using independent signaling (RRC signaling) for each terminal 102, and the terminal 102 configures the E-PDCCH region (potential E-PDCCH) on the basis of the control information (step S1503). Here, as a method for specifying the E-PDCCH region, a method for specifying part or all of the RBs in the frequency band may be used. For example, whether or not the E-PDCCH can be arranged can be expressed in a bitmap format for each PRB. In addition to this, some subframes in the time domain may be specified as subframes in which the E-PDCCH can be arranged. For example, a method in which a period of subframes and offset values from a reference subframe are specified may be used. Alternatively, whether or not an E-PDCCH can be arranged may be expressed in the bitmap format for each subframe in a radio frame (ten subframes) or a plurality of radio frames. In addition, whether the localized E-PDCCH transmission or the distributed E-PDCCH transmission is used may be transmitted at this time. The terminal 102 for which the E-PDCCH region has been configured monitors an E-PDCCH that specifies transmission data intended for the terminal 102. Meanwhile, the terminal 102 continues monitoring a PDCCH that specifies transmission data to be broadcast in the PDCCH region. That is, at this point of time, the terminal 102 is monitoring a PDCCH that specifies transmission data to be broadcast in the PDCCH region and an E-PDCCH that specifies transmission data intended for the terminal 102 in the E-PDCCH region.

It is to be noted that the number of SSs in one E-PDCCH region may be one, or a plurality of SSs may be configured in one E-PDCCH region. In this case, the configuration of the E-PDCCH region may include the configurations of the SSs. In addition, whether the localized E-PDCCH transmission or the distributed E-PDCCH transmission is used may be configured for each SS in the E-PDCCH region.

Next, the base station 101 transmits, to the terminal 102, control information that specifies (configures and transmits) the monitoring of an E-PDCCH that specifies transmission data to be broadcast using independent signaling (RRC signaling) for each terminal 102, and the terminal 102 configures monitoring of specification of paging, SI, an RA response, or the like in the E-PDCCH region on the basis of the control information (step S1504).

After step S1504, the terminal 102 monitors an E-PDCCH (specification of paging, SI, an RA response, or the like) that specifies transmission data to be broadcast (paging, system information, a random access response, or the like) in the E-PDCCH region. That is, the terminal 102 switches the region in which a control channel that specifies transmission data is monitored from the PDCCH region to the E-PDCCH region.

When it is necessary to transmit transmission data to be broadcast (paging, system information, a random access response, or the like), the base station 101 transmits an E-PDCCH that specifies (determines) the transmission data to be broadcast at least in the E-PDCCH region (S1505). Alternatively, the base station 101 may transmit a PDCCH that specifies (determines) the transmission data to be broadcast in the PDCCH region (S1505).

Since the terminal 102 is monitoring an E-PDCCH that specifies transmission data to be broadcast in the E-PDCCH region, the terminal 102 detects the E-PDCCH transmitted from the base station 101 (S1506).

Figure 16:
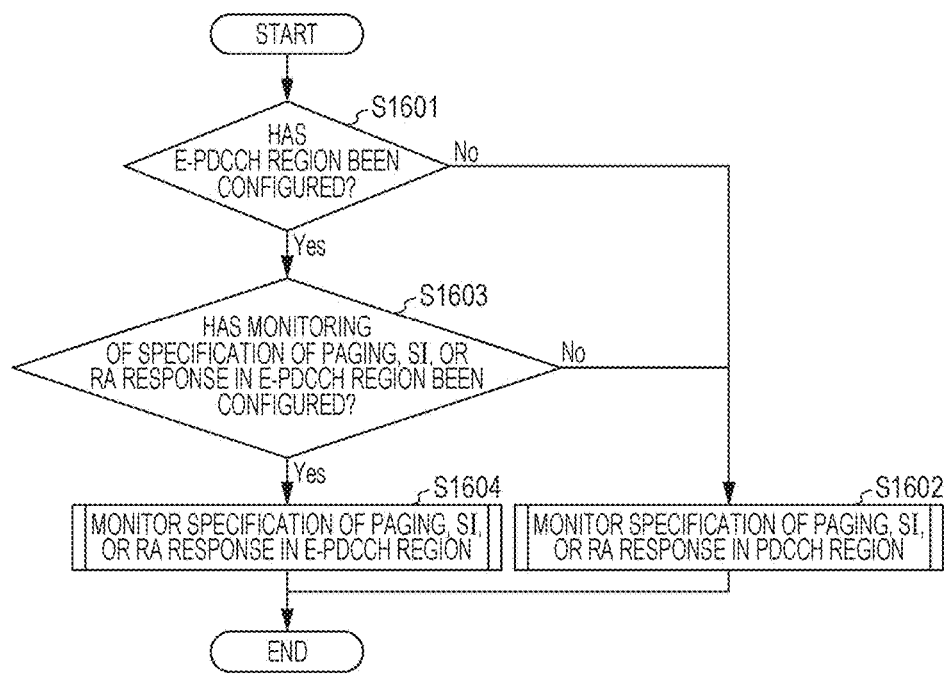
FIG. 16 is a flowchart illustrating an operation performed by the terminal according to the embodiment.

FIG. 16 is a flowchart illustrating an operation performed by the terminal 102. First, whether or not an E-PDCCH region has been configured is determined (step S1601). If an E-PDCCH region has not been configured (NO in step S1601), a PDCCH that specifies transmission data to be broadcast is monitored in the PDCCH region (step S1602). On the other hand, if an E-PDCCH region has been configured (YES in step S1601), whether or not monitoring of an E-PDCCH that specifies transmission data to be broadcast has been configured is determined (step S1603). If monitoring of an E-PDCCH that specifies transmission data to be broadcast has not been configured (NO in step S1603), a PDCCH that specifies transmission data to be broadcast is monitored in the PDCCH region (step S1602). On the other hand, if monitoring of an E-PDCCH that specifies transmission data to be broadcast has been configured (YES in step S1603), an E-PDCCH that specifies transmission data to be broadcast is monitored in the E-PDCCH region (step S1604).

Thus, in the communication system according to this embodiment, the base station explicitly specifies (configures and transmits) monitoring of an E-PDCCH that specifies transmission data to be broadcast performed by the terminal in the E-PDCCH region. If monitoring (decoding of an E-PDCCH to which CRC check bits scrambled by an RNTI corresponding to transmission data to be broadcast are added) of an E-PDCCH that specify transmission data to be broadcast has not been configured, the terminal monitors a PDCCH that specifies transmission data to be broadcast not in the E-PDCCH region but in the PDCCH region (decodes a PDCCH to which CRC check bits scrambled by an RNTI corresponding to transmission data to be broadcast are added). On the other hand, if monitoring of an E-PDCCH that specifies transmission data to be broadcast has been configured, the terminal monitors an E-PDCCH that specifies transmission data to be broadcast not in the PDCCH region but in the E-PDCCH region.

Thus, the region in which a control channel that specifies transmission data is monitored can be adaptively switched. Therefore, not only when the base station transmits control information intended for the terminal using a physical downlink control channel but also when the base station transmits control information intended for the terminal using an extended physical downlink control channel, transmission data intended for each terminal or transmission data shared by a plurality of terminals can be efficiently specified.

Second Embodiment

In the first embodiment, a communication system has been described in which a base station explicitly specifies (configures and transmits) monitoring of an E-PDCCH that specifies transmission data to be broadcast performed by a terminal in the E-PDCCH region. In a second embodiment of the present invention, a communication system will be described in which a base station implicitly specifies (configures and transmits) monitoring of an E-PDCCH that specifies transmission data to be broadcast performed by a terminal in the E-PDCCH region.

It is to be noted that the communication system according to this embodiment may use the same configuration as that of the communication system illustrated in FIG. 1. In addition, the block configurations of the base station 101 and the terminal 102 according to this embodiment may be the same as those illustrated in FIG. 4 and FIG. 5, respectively. However, a procedure for transmitting transmission data from a base station to a terminal is slightly different from that according to the first embodiment. Therefore, the procedure for transmitting transmission data from a base station to a terminal will be described while particularly focusing on a case in which transmission data shared by a plurality of terminals (transmission data to be broadcast) is transmitted.

Figure 17:
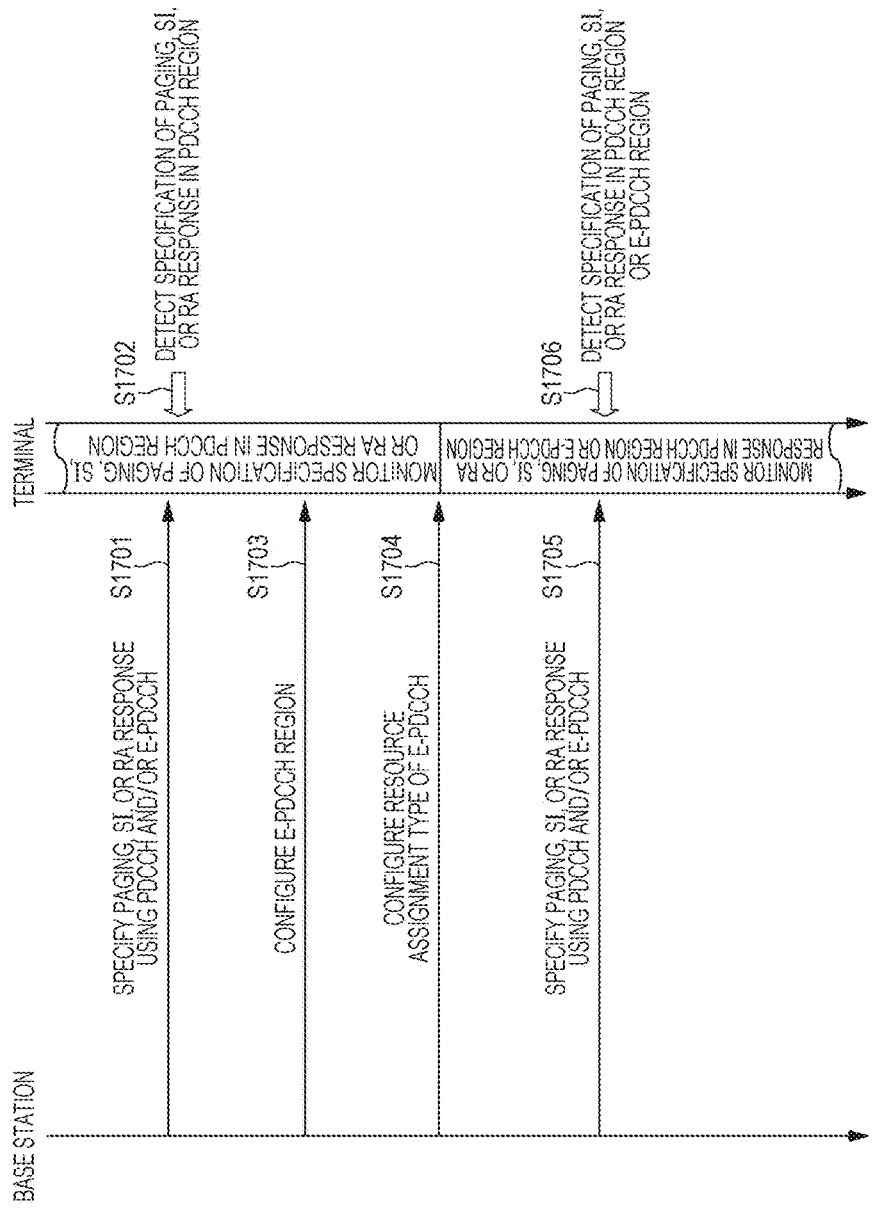
FIG. 17 is a diagram illustrating a procedure for transmitting downlink data from a base station to a terminal according to a second embodiment of the present invention.

FIG. 17 is a diagram illustrating a procedure for transmitting downlink data from the base station 101 to the terminal 102. After initial access, the terminal 102 monitors a PDCCH (specification of paging, SI, an RA response, or the like) that specifies transmission data to be broadcast (paging, system information, a random access response, or the like) in the PDCCH region. When it is necessary to transmit transmission data to be broadcast (paging, system information, a random access response, or the like), the base station 101 transmits a PDCCH that specifies (determines) the transmission data to be broadcast at least in the PDCCH region (S1701). Alternatively, the base station 101 may transmit an E-PDCCH that specifies (determines) the transmission data to be broadcast in the E-PDCCH region (S1701). It is to be noted that although timings of specification using a PDCCH and specification using an E-PDCCH seem to be the same in the figure, the timings are not limited to this.

Since the terminal 102 is monitoring a PDCCH that specifies transmission data to be broadcast in the PDCCH region, the terminal 102 detects the PDCCH transmitted from the base station 101 (S1702).

The base station 101 transmits control information that specifies (configures and transmits) an E-PDCCH region to the terminal 102 using independent signaling (RRC signaling) for each terminal 102, and the terminal 102 configures the E-PDCCH region (potential E-PDCCH) on the basis of the control information (step S1703). Here, as a method for specifying the E-PDCCH region, the same method as that described in the first embodiment may be used.

The terminal 102 for which the E-PDCCH region has been configured monitors an E-PDCCH that specifies transmission data intended for the terminal 102. Meanwhile, the terminal 102 continues monitoring a PDCCH that specifies transmission data to be broadcast in the PDCCH region. That is, at this point of time, the terminal 102 is monitoring a PDCCH that specifies transmission data to be broadcast in the PDCCH region and an E-PDCCH that specifies transmission data intended for the terminal 102 in the E-PDCCH region.

Next, the base station 101 transmits, to the terminal 102, control information that specifies (configures and transmits) whether the localized E-PDCCH transmission or the distributed E-PDCCH transmission is used using independent signaling (RRC signaling) for each terminal 102, and the terminal 102 configures monitoring of an E-PDCCH transmitted through the localized E-PDCCH transmission or the distributed E-PDCCH transmission on the basis of the control information (step S1704).

It is to be noted that the number of SSs configured in step S1703 in one E-PDCCH region may be one, or a plurality of SSs may be configured in one E-PDCCH region. In this case, whether the localized E-PDCCH transmission or the distributed E-PDCCH transmission is used may be configured for each SS in the E-PDCCH region in step S1704.

If the distributed E-PDCCH transmission is configured in step S1704 (if the distributed E-PDCCH transmission is configured for the entirety of the E-PDCCH region or if the distributed E-PDCCH transmission is configured for at least one SS in the E-PDCCH region), the terminal 102 monitors an E-PDCCH (specification of paging, SI, an RA response, or the like) that specifies transmission data to be broadcast (paging, system information, a random access response, or the like) in the E-PDCCH region. That is, the terminal 102 switches the region in which a control channel that specifies transmission data is monitored from the PDCCH region to the E-PDCCH region. Here, a case in which the distributed E-PDCCH transmission has been configured will be described. It is to be noted that although a case in which the processing in step S1704 is performed after step S1703 is illustrated in FIG. 17, step S1703 and step S1704 may be processed (signaling and/or configuration) at the same timing.

When it is necessary to transmit transmission data to be broadcast (paging, system information, a random access response, or the like), the base station 101 transmits an E-PDCCH that specifies (determines) the transmission data to be broadcast at least in the E-PDCCH region (S1705). Alternatively, the base station 101 may transmit a PDCCH that specifies (determines) the transmission data to be broadcast in the PDCCH region (S1705).

Since the terminal 102 is monitoring an E-PDCCH that specifies transmission data to be broadcast in the E-PDCCH region, the terminal 102 detects the E-PDCCH transmitted from the base station 101 (S1706).

Figure 18:
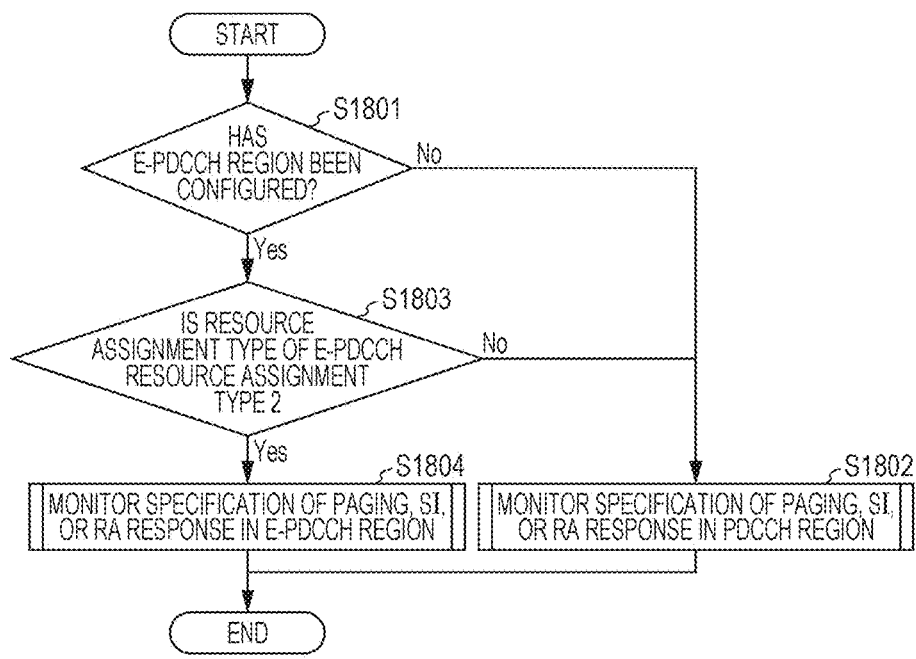
FIG. 18 is a flowchart illustrating an operation performed by the terminal according to the embodiment.

FIG. 18 is a flowchart illustrating an operation performed by the terminal 102. First, whether or not an E-PDCCH region has been configured is determined (step S1801). If an E-PDCCH region has not been configured (NO in step S1801), a PDCCH that specifies transmission data to be broadcast is monitored in the PDCCH region (step S1802). On the other hand, if an E-PDCCH region has been configured (YES in step S1801), whether or not the distributed E-PDCCH transmission (Resource Assignment Type 2) has been configured is determined (step S1803). If the localized E-PDCCH transmission (Resource Assignment Type 1) has been configured, that is, if the distributed E-PDCCH transmission (Resource Assignment Type 2) has not been configured (NO in step S1803), a PDCCH that specifies transmission data to be broadcast is monitored in the PDCCH region (step S1802). On the other hand, if the localized E-PDCCH transmission (Resource Assignment Type 1) has not been configured, that is, if the distributed E-PDCCH transmission (Resource Assignment Type 2) has been configured (YES in step S1803), an E-PDCCH that specifies transmission data to be broadcast is monitored in the E-PDCCH region (step S1804).

Figure 19:
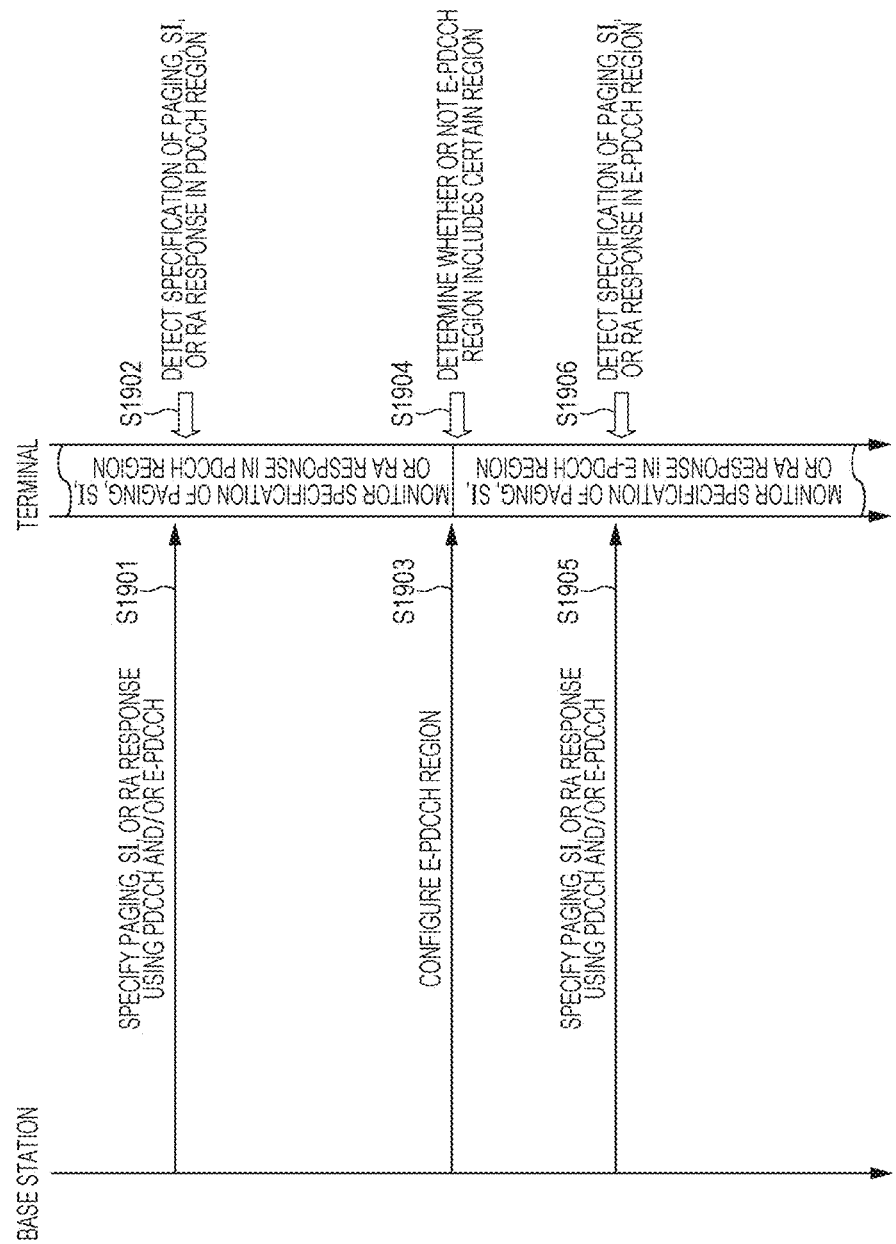
FIG. 19 is a diagram illustrating another example of the procedure for transmitting downlink data from the base station to the terminal according to the embodiment.

FIG. 19 is a diagram illustrating another example of the procedure for transmitting downlink data from the base station 101 to the terminal 102. After initial access, the terminal 102 monitors a PDCCH (specification of paging, SI, an RA response, or the like) that specifies transmission data to be broadcast (paging, system information, a random access response, or the like) in the PDCCH region. When it is necessary to transmit transmission data to be broadcast (paging, system information, a random access response, or the like), the base station 101 transmits a PDCCH that specifies (determines) the transmission data to be broadcast at least in the PDCCH region (S1901). Alternatively, the base station 101 may transmit an E-PDCCH that specifies (determines) the transmission data to be broadcast in the E-PDCCH region (S1901). It is to be noted that although timings of specification using a PDCCH and specification using an E-PDCCH seem to be the same in the figure, the timings are not limited to this.

Since the terminal 102 is monitoring a PDCCH that specifies transmission data to be broadcast in the PDCCH region, the terminal 102 detects the PDCCH transmitted from the base station 101 (S1902).

The base station 101 transmits control information that specifies (configures and transmits) an E-PDCCH region to the terminal 102 using independent signaling (RRC signaling) for each terminal 102, and the terminal 102 configures the E-PDCCH region (potential E-PDCCH) on the basis of the control information (step S1903). Here, as a method for specifying the E-PDCCH region, the same method as that described in the first embodiment may be used.

At this time, if the base station 101 causes the terminal 102 to monitor an E-PDCCH (specification of paging, SI, an RA response, or the like) that specifies transmission data to be broadcast (paging, system information, a random access response, or the like) in the E-PDCCH region, the base station 101 specifies (configures and transmits) the E-PDCCH region such that the E-PDCCH region includes a certain region.

The terminal 102 determines whether or not the E-PDCCH region transmitted in step S1903 includes a certain region (step S1904). If the E-PDCCH region includes a certain region (if the PDCCH region includes the entirety of a certain region or if the PDCCH region includes at least part of a certain region), the terminal 102 monitors an E-PDCCH (specification of paging, SI, an RA response, or the like) that specifies transmission data to be broadcast (paging, system information, a random access response, or the like) in the E-PDCCH region. That is, the terminal 102 switches the region in which a control channel that specifies transmission data is monitored from the PDCCH region to the E-PDCCH region. Here, a case in which the E-PDCCH region includes a certain region will be described.

When it is necessary to transmit transmission data to be broadcast (paging, system information, a random access response, or the like), the base station 101 transmits an E-PDCCH that specifies (determines) the transmission data to be broadcast at least in the E-PDCCH region (S1905). Alternatively, the base station 101 may transmit a PDCCH that specifies (determines) the transmission data to be broadcast in the PDCCH region (S1905).

Since the terminal 102 is monitoring an E-PDCCH that specifies transmission data to be broadcast in the E-PDCCH region, the terminal 102 detects the E-PDCCH transmitted from the base station 101 (S1906).

Figure 20:
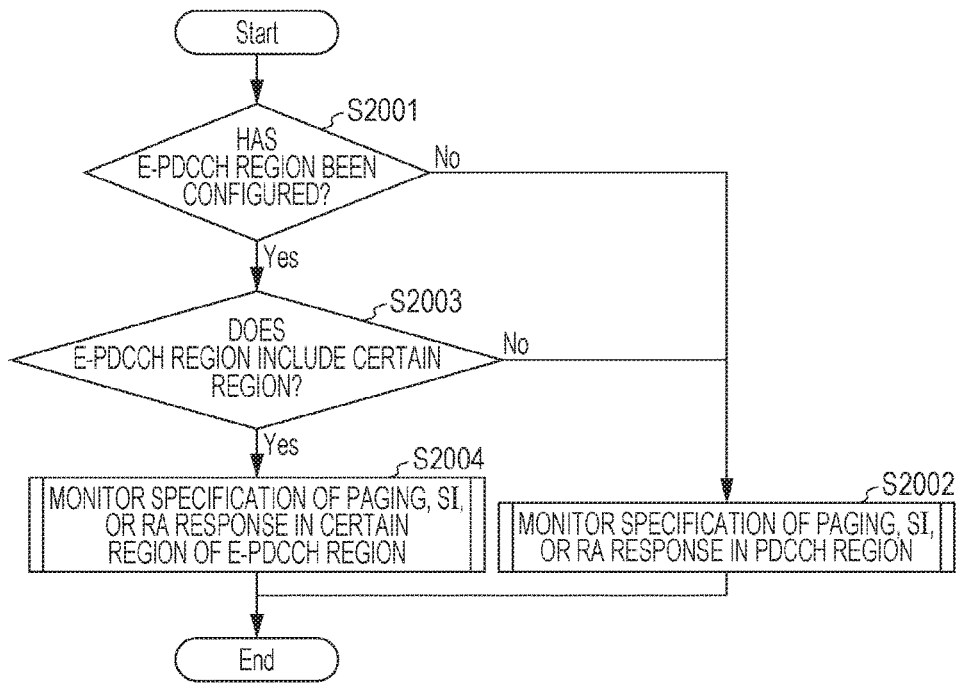
FIG. 20 is a flowchart illustrating an operation performed by the terminal according to the embodiment.
Figure 21:
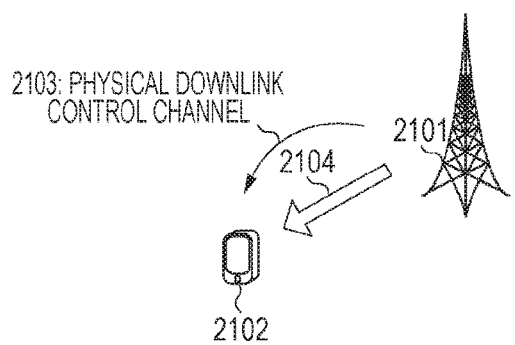
FIG. 21 is a diagram illustrating an example of the configuration of a communication system.

FIG. 20 is a flowchart illustrating an operation performed by the terminal 102. First, whether or not an E-PDCCH region has been configured is determined (step S2001). If an E-PDCCH region has not been configured (NO in step S2001), a PDCCH that specifies transmission data to be broadcast is monitored in the PDCCH region (step S2002). On the other hand, if an E-PDCCH region has been configured (YES in step S2001), whether or not the E-PDCCH region includes a certain region is determined (step S2003). If the E-PDCCH region does not include a certain region, a PDCCH that specifies transmission data to be broadcast are monitored in the PDCCH region (step S2002). On the other hand, if the E-PDCCH region includes a certain region, an E-PDCCH that specifies transmission data to be broadcast is monitored in the E-PDCCH region (step S2004).

Thus, in the communication system according to this embodiment, the base station implicitly specifies (configures and transmits) monitoring of an E-PDCCH that specifies transmission data to be broadcast performed by a terminal in the E-PDCCH region. If monitoring (decoding of an E-PDCCH to which CRC check bits scrambled by an RNTI corresponding to transmission data to be broadcast are added) of an E-PDCCH that specifies transmission data to be broadcast has not been configured, the terminal monitors a PDCCH that specifies transmission data to be broadcast not in the E-PDCCH region but in the PDCCH region (decodes a PDCCH to which CRC check bits scrambled by an RNTI corresponding to transmission data to be broadcast are added). On the other hand, if monitoring of an E-PDCCH that specifies transmission data to be broadcast has been configured, the terminal monitors an E-PDCCH that specifies transmission data to be broadcast not in the PDCCH region but in the E-PDCCH region.

Thus, the region in which a control channel that specifies transmission data is monitored can be adaptively switched. Therefore, not only when the base station transmits control information intended for the terminal using a physical downlink control channel but also when the base station transmits control information intended for the terminal using an extended physical downlink control channel, transmission data intended for each terminal or transmission data shared by a plurality of terminals can be efficiently specified.

It is to be noted that although an example in which the resource assignment type of E-PDCCH is transmitted and the region in which a control channel that specifies transmission data is monitored is switched in accordance with the resource assignment type and an example in which the region in which a control channel that specifies transmission data is monitored is switched in accordance with whether the E-PDCCH region includes a certain region have been described as examples in which the base station implicitly specifies (configures and transmits) monitoring of an E-PDCCH that specifies transmission data to be broadcast performed by the terminal in the E-PDCCH region. However, examples are not limited to these. For example, the region may be switched in accordance with other types of information including information regarding the E-PDCCH such as the number of PRB pairs configured as the E-PDCCH region and the position of the E-PDCCH region, information regarding a communication mode such as a transmission mode or a report mode, and information regarding RSs (reference signals) (the number of CSI-RSs (channel state information-RSs), a method for generating DM-RS (demodulation-RS) sequences, and the like).

It is to be noted that although resource elements and resource blocks are used as units of mapping of data channels, control channels, PDSCHs, PDCCHs, and reference signals in the above embodiments, the units are not limited to these. The same effects can be produced even if regions configured by arbitrary frequency and time and time units are used instead of these.

In addition, although the extended physical downlink control channel 103 arranged in the PDSCH region is referred to as an E-PDCCH to clarify the differences from the existing physical downlink control channel (PDCCH) in the above embodiments, the way of naming is not limited to this. Even if both the types of channel are referred to as a PDCCH, the essence is the same as that of the above embodiments insofar as the extended physical downlink control channel arranged in the PDSCH region and the existing physical downlink control channel arranged in the PDCCH region act differently.

It is to be noted that programs operating on the base station and the terminal according to the present invention are programs (programs that cause a computer to function) that control CPUs or the like in such a way as to realize the functions according to the present invention. In addition, information handled by these devices is temporarily accumulated in RAMs during processing, and then stored in various ROMs and HDDs and read, corrected, and written by the CPUs as necessary. As a recording medium that stores the programs, any of semiconductor media (for example, a ROM, a nonvolatile memory card, and the like), optical recording media (for example, a DVD, an MO, an MD, a CD, a BD, and the like), magnetic recording media (for example, a magnetic tape, a flexible disk, and the like), and the like may be used. In addition, not only the functions of the above-described embodiments are realized by executing loaded programs but also the functions of the present invention might be realized by performing processing in cooperation with an operating system, another application program, or the like on the basis of instructions from the programs.

In addition, when the programs are to be distributed in the market, the programs can be stored in portable recording media and distributed, or the programs can be transferred to a server computer connected through a network such as the Internet. In this case, a storage device of the server computer is also included in the present invention. In addition, part or the entirety of the base station and the terminal in the above-described embodiments may be realized as LSI, which is typically integrated circuits. The function blocks of the base station and the terminal may be individually realized as chips, or part or all of the function blocks may be integrated and realized as a chip. In addition, a method for realizing these devices as integrated circuits is not limited to LSI, but dedicated circuits or general-purpose processors may be used. In addition, if a technique for realizing these devices as integrated circuits that replaces LSI appears as a result of evolution of semiconductor technologies, integrated circuits realized by the technique may be used.

Although the embodiments of the present invention have been described with reference to the drawings, specific configurations are not limited to those according to the embodiments, and design changes and the like that do not deviate from the scope of the present invention are also included. In addition, the present invention may be modified in various ways within the scope disclosed in the claims, and embodiments obtained by combining technical means disclosed in different embodiments as necessary are also included in the technical scope of the present invention. In addition, configurations obtained by replacing elements that have been described in the above embodiments and that produce the same effects with each other are also included.

INDUSTRIAL APPLICABILITY

The present invention can be desirably used for a radio base station device, a radio terminal device, a radio communication system, and a radio communication method.

REFERENCE SIGNS LIST

101 base station
102 terminal
103 extended physical downlink control channel
104 downlink transmission data
401 codeword generation unit
402 downlink subframe generation unit
403 physical downlink control channel generation unit
404 OFDM signal transmission unit
405, 509 transmission antenna
406, 501 reception antenna
407 SC-FDMA signal reception unit
408 uplink subframe processing unit 409, 506 higher layer
502 OFDM signal reception unit
503 downlink subframe processing unit
504 physical downlink control channel extraction unit
505 codeword extraction unit
507 uplink subframe generation unit
508 SC-FDMA signal transmission unit
2101 base station
2102 terminal
2103 physical downlink control channel
2104 downlink transmission data

The invention claimed is:

1. A terminal that communicates with a base station, the terminal comprising:
higher layer control information obtaining circuitry that obtains a first higher layer control information that specifies multiple sets of a plurality of physical resource blocks (PRBs) for an enhanced physical downlink control channel transmission, and obtains a second higher layer control information that indicates monitoring an enhanced physical downlink control channel with Cyclic Redundancy Check (CRC) bits scrambled by an identity used in paging; and
downlink control channel detection circuitry that monitors the enhanced physical downlink control channel with the CRC bits scrambled by the identity used in paging; wherein
each of the multiple sets of the plurality of PRBs includes more than one search space;
the terminal is not required to monitor a physical downlink control channel with the CRC bits scrambled by the identity used in paging;
the physical downlink control channel is mapped on a beginning portion of a subframe;
the enhanced physical downlink control channel is mapped on a portion of the subframe other than the beginning portion of the subframe;
the enhanced physical downlink control channel is transmitted using one or more enhanced physical downlink control channel elements;
each of the plurality of PRBs includes a plurality of sets of first resource elements;
multiple sets of the first resource elements define each of the one or more enhanced physical downlink control channel elements;
the enhanced physical downlink control channel is transmitted using either localized transmission or distributed transmission; and
in a case where the distributed transmission is used, one of the one or more enhanced physical downlink control channel elements corresponds to the plurality of sets of first resource elements included in at least two of the one or more enhanced physical downlink control channel elements for the localized transmission.

2. A base station that communicates with a terminal, the base station comprising:
higher layer control information obtaining circuitry that transmits a first higher layer control information that specifies multiple sets of a plurality of physical resource blocks (PRBs) for an enhanced physical downlink control channel transmission, and transmits a second higher layer control information that indicates the terminal's monitoring of an enhanced physical downlink control channel with Cyclic Redundancy Check (CRC) bits scrambled by an identity used in paging; and downlink control channel transmission circuitry that transmits the enhanced physical downlink control channel with the CRC bits scrambled by the identity used in paging; wherein,
each of the multiple sets includes more than one search space;
the terminal is not required to monitor a physical downlink control channel with the CRC bits scrambled by the identity used in paging;
the physical downlink control channel is mapped on a beginning portion of a subframe;
the enhanced physical downlink control channel is mapped on a portion of the subframe other than the beginning portion of the subframe;
the enhanced physical downlink control channel is transmitted using one or more enhanced physical downlink control channel elements;
each of the plurality of PRBs includes a plurality of sets of first resource elements;
multiple sets of the first resource elements define each of the one or more enhanced physical downlink control channel elements;
the enhanced physical downlink control channel is transmitted using either localized transmission or distributed transmission; and
in a case where the distributed transmission is used, one of the one or more enhanced physical downlink control channel elements corresponds to the plurality of sets of first resource elements included in at least two of the one or more enhanced physical downlink control channel elements for the localized transmission.

3. A communication method used by a terminal that communicates with a base station, the communication method comprising the steps of:
obtaining a first higher layer control information that specifies multiple sets of a plurality of physical resource blocks (PRBs) for an enhanced physical downlink control channel transmission;
obtaining a second higher layer control information that indicates monitoring an enhanced physical downlink control channel with Cyclic Redundancy Check (CRC) bits scrambled by an identity for paging; and
monitoring the enhanced physical downlink control channel with the CRC bits scrambled by the identity used in paging; wherein
each of the multiple sets of the plurality of PBRs includes more than one search space;
the terminal is not required to monitor a physical downlink control channel with the CRC bits scrambled by the identity used in paging,
the physical downlink control channel is mapped on a beginning portion of a subframe,
the enhanced physical downlink control channel is mapped on a portion of the subframe other than the beginning portion of the subframe,
the enhanced physical downlink control channel is transmitted using one or more enhanced physical downlink control channel elements,
each of the plurality of PRBs includes a plurality of sets of first resource elements,
multiple sets of the first resource elements define each of the one or more enhanced physical downlink control channel elements,
the enhanced physical downlink control channel is transmitted using either localized transmission or distributed transmission, and
in a case where the distributed transmission is used, one of the one or more enhanced physical downlink control channel elements corresponds to the plurality of sets of first resource elements included in at least two of the one or more enhanced physical downlink control channel elements for the localized transmission.

4. A communication method used by a base station that communicates with a terminal, the communication method comprising the steps of:
- transmitting a first higher layer control information that specifies multiple sets of a plurality of physical resource blocks (PRBs) for an enhanced physical downlink control channel transmission;
- transmitting a second higher layer control information that indicates the terminal's monitoring of an enhanced physical downlink control channel with Cyclic Redundancy Check (CRC) bits scrambled by an identity used in paging; and
- transmitting the enhanced physical downlink control channel with the CRC bits scrambled by the identity used in paging; wherein
- each of the multiple sets includes more than one search space,
- the terminal is not required to monitor a physical downlink control channel with the CRC bits scrambled by the identity used in paging,
- the physical downlink control channel is mapped on a beginning portion of a subframe,
- the enhanced physical downlink control channel is mapped on a portion of the subframe other than the beginning portion of the subframe,
- the enhanced physical downlink control channel is transmitted using one or more enhanced physical downlink control channel elements,
- each of the plurality of PRBs includes a plurality of sets of first resource elements;
- multiple sets of the first resource elements define each of the one or more enhanced physical downlink control channel elements,
- the enhanced physical downlink control channel is transmitted using either localized transmission or distributed transmission, and
- in a case where the distributed transmission is used, one of the one or more enhanced physical downlink control channel elements corresponds to the plurality of sets of first resource elements included in at least two of the one or more enhanced physical downlink control channel elements for the localized transmission.

* * * * *